(12) United States Patent
Yoon et al.

(10) Patent No.: US 11,665,708 B2
(45) Date of Patent: May 30, 2023

(54) COMMUNICATION METHOD AND APPARATUS USING BEAMFORMING IN WIRELESS COMMUNICATION SYSTEM

(71) Applicant: SAMSUNG ELECTRONICS CO., LTD., Suwon-si (KR)

(72) Inventors: Suha Yoon, Suwon-si (KR); Seho Myung, Suwon-si (KR); Sungchul Park, Suwon-si (KR); Suyoung Park, Suwon-si (KR); Euichang Jung, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/724,533

(22) Filed: Apr. 20, 2022

(65) Prior Publication Data

US 2022/0256585 A1 Aug. 11, 2022

Related U.S. Application Data

(63) Continuation of application No. 17/056,447, filed as application No. PCT/KR2019/002953 on Mar. 14, 2019, now Pat. No. 11,343,840.

(30) Foreign Application Priority Data

May 24, 2018 (KR) ........................ 10-2018-0059059

(51) Int. Cl.
*H04W 16/28* (2009.01)
*H04W 72/23* (2023.01)
*H04W 72/044* (2023.01)

(52) U.S. Cl.
CPC ........... *H04W 72/23* (2023.01); *H04W 16/28* (2013.01); *H04W 72/046* (2013.01)

(58) Field of Classification Search
CPC .............................. H04W 72/12; H04W 16/28
See application file for complete search history.

(56) References Cited

U.S. PATENT DOCUMENTS 10,588,042 B2   3/2020  Nagaraja
2015/0139135 A1  5/2015  Kim
(Continued)

FOREIGN PATENT DOCUMENTS

| EP | 3 665 792 | 6/2020 |
| WO | 2017/173038 | 10/2017 |
| WO | 2019/032882 | 2/2019 |

OTHER PUBLICATIONS

U.S. Appl. No. 17/056,447, filed Nov. 18, 2020, Yoon et al.
(Continued)

*Primary Examiner* — Michael T Vu
(74) *Attorney, Agent, or Firm* — Nixon & Vanderhye P.C.

(57) ABSTRACT

The present disclosure relates to a communication technique for fusing, with an IoT technology, a 5G communication system for supporting a higher data transmission rate than a 4G system, and a system therefor. The present disclosure may be applied to intelligent services, such as smart homes, smart buildings, smart cities, smart cars or connected cars, health care, digital education, retail, and security and safety related services, on the basis of 5G communication technologies and IoT-related technologies. The present disclosure discloses a communication method and apparatus between a terminal and a base station in a communication system to which beamforming is applied.

20 Claims, 17 Drawing Sheets

(56) References Cited

U.S. PATENT DOCUMENTS

| | | | |
|---|---|---|---|
| 2017/0086220 A1 | 3/2017 | Kim et al. | |
| 2019/0141679 A1 | 5/2019 | He | |
| 2019/0357291 A1* | 11/2019 | Zhou | H04W 24/08 |
| 2020/0187172 A1 | 6/2020 | Wang | |
| 2020/0305129 A1 | 9/2020 | Lee et al. | |

OTHER PUBLICATIONS

Office Action dated May 19, 2021 for U.S. Appl. No. 17/056,447, 14 pages.

Final Office Action dated Oct. 13, 2021 for U.S. Appl. No. 17/056,447, 10 pages.

"PDCCH search space design", CATT, R1-1715813, 3GPP TSG RAN WG1 Meeting AH_#NR3, Nagoya, Japan, Sep. 18-21, 2017, 12 pages.

"PDCCH CORESET configuration and UE procedure on NR-PDCCH", Guangdong OPPO Mobile Telecom, R1-1710150, 3GPP TSG RAN WG1 NR Ad-Hoc#2, Qingdao, P.R. China, Jun. 27-30, 2017, 10 pages.

"Search space design for NR-PDCCH", NTT DOCOMO, Inc., R1-1716094, 3GPP TSG RAN WG1 Meeting NR#3, Nagoya, Japan, Sep. 18-21, 2017, 13 pages.

"Remaining Details on QCL", Qualcomm Incorporated, R1-1807351, 3GPP TSG-RAN WG1 Meeting #93, Busan, Korea, May 21-25, 2018, 12 pages.

International Search Report for PCT/KR2019/002953 dated Jun. 24, 2019, 5 pages.

Written Opinion of the ISA for PCT/KR2019/002953 dated Jun. 24, 2019, 5 pages.

Extended European Search Report for EP Application No. 19808292.7 dated Oct. 5, 2021, 15 pages.

Lenovo et al., "Discussion of beam management and reporting" R1-1717866, 3GPP TSG RAN WG1 Meeting #90bis, Prague, P.R. Czech, Oct. 9-13, 2017, 4 pages.

Intel Corporation, "On CORESETs and search spaces" R1-1716306, 3GPP TSG RAN WG1 NR Adhoc#3, Nagoya, Japan, Sep. 18-21, 2017, 12 pages.

Huawei et al., "Summary of remaining issues on PDCCH monitoring with TP" R1-1805901, 3GPP TSG RAN WG1 Meeting #92bis, Busan, Korea, May 21-25, 2018, 5 pages.

* cited by examiner

COMMUNICATION METHOD AND APPARATUS USING BEAMFORMING IN WIRELESS COMMUNICATION SYSTEM

This application is a continuation of U.S. application Ser. No. 17/056,447 filed Nov. 18, 2020, which is a U.S. national phase application of International Application No. PCT/KR2019/002953 filed Mar. 14, 2019 which designated the U.S. and claims priority to KR Patent Application No. 10-2018-0059059 filed May 24, 2018, the entire contents of each of which are hereby incorporated by reference.

The disclosure relates to 5G wireless communication (or next-generation wireless communication) and, more particularly, to communication between a user equipment and a base station in a wireless communication system to which beamforming is applied.

In order to satisfy wireless data traffic demands that tend to increase after 4G communication system commercialization, efforts to develop an enhanced 5G communication system or a pre-5G communication system are being made. For this reason, the 5G communication system or pre-5G communication system is called a beyond 4G network communication system or a post LTE system.

In order to achieve a high data transfer rate, an implementation of the 5G communication system in a mmWave band (e.g., 60 GHz band) is taken into consideration. In order to reduce a path loss of a radio wave and increase the transfer distance of electric waves in the mmWave band, beamforming, massive MIMO, full dimensional MIMO (FD-MIMO), an array antenna, analog beamforming and large scale antenna technologies are being discussed in the 5G communication system.

Furthermore, in order to improve the network of a system, technologies, such as an improved small cell, an advanced small cell, a cloud radio access network (cloud RAN), an ultra-dense network, device to device communication (D2D), wireless backhaul, a moving network, cooperative communication, coordinated multi-points (CoMP), and reception interference cancellation, are being developed in the 5G communication system.

In addition, hybrid FSK and QAM modulation (FQAM) and sliding window superposition coding (SWSC) that are advanced coding modulation (ACM) schemes, and filter bank multi-carrier (FBMC), non-orthogonal multiple access (NOMA) and sparse code multiple access (SCMA), that is, advanced access technologies, are being developed in the 5G system.

Meanwhile, the Internet evolves from a human-centered connection network over which human generates and consumes information to Internet of Things (IoT) through which information is exchanged and processed between distributed elements, such as things. An Internet of Everything (IoE) technology in which a big data processing technology through a connection with a cloud server is combined with the IoT technology is emerging. In order to implement the IoT, technical elements, such as the sensing technology, wired/wireless communication and network infrastructure, service interface technology and security technology, are required. Accordingly, technologies, such as a sensor network, machine to machine (M2M) and machine type communication (MTC) for a connection between things, are recently researched. In the IoT environment, an intelligent Internet technology (IT) service in which a new value is created for human life by collecting and analyzing data generated from connected things may be provided. The IoT may be applied to fields, such as a smart home, a smart building, a smart city, a smart car or a connected car, a smart grid, health care, smart home appliances, and advanced medical services, through convergence and composition between the existing information technology (IT) and various industries.

Accordingly, various attempts to apply the 5G communication system to the IoT are being made. For example, 5G communication technologies, such as a sensor network, machine to machine (M2M) and machine type communication (MTC), are implemented by schemes, such as beamforming, MIMO, and an array antenna. The application of a cloud radio access network (cloud RAN) as the aforementioned big data processing technology may be said to be an example of convergence between the 5G technology and the IoT technology.

Meanwhile, as described above, in a communication system using beamforming, a user equipment may perform communication with a base station through a plurality of beams. Accordingly, various discussions take place in order for transmission and reception using beamforming to be smoothly performed.

The disclosure proposes a method and apparatus for smoothly transmitting and receiving control information through a control channel between an user equipment and a base station in a communication environment using beamforming. Technical objects to be achieved in the disclosure are not limited to the aforementioned technical objects, and other technical objects not described above may be considered by a person having ordinary knowledge in the art to which the disclosure pertains from embodiments of the disclosure to be described later.

A method of a user equipment according to an embodiment of the disclosure includes a operation of receiving a downlink signal from a base station using a first beam, an operation of determining whether a downlink control channel is able to be monitored using a second beam, and an operation of skipping the monitoring of the downlink control channel if the downlink control channel is determined to be unable to be monitored using the second beam.

According to an embodiment of the disclosure, the operation of determining may include determining that the downlink control channel is unable to be monitored in case that a time interval in which data is received from the downlink signal using the first beam and timing at which the downlink control channel is monitored in the downlink signal using the second beam overlap.

According to an embodiment of the disclosure, the data received using the first beam may be data scheduled through a control channel or data configured by semi-persistent scheduling (SPS).

According to an embodiment of the disclosure, the operation of determining may include determining that the downlink control channel is unable to be monitored, in case that a time offset up to timing at which the downlink control channel is monitored using the second beam after the reception of the data using the first beam is terminated is less than a threshold value.

According to an embodiment of the disclosure, the operation of determining may include determining that the downlink control channel is unable to be monitored, in case that a time offset up to the downlink control monitoring using the second beam after the monitoring of the downlink control channel using the first beam is less than a threshold value.

According to an embodiment of the disclosure, the method of the user equipment may further include an operation of selecting a beam for the monitoring of the downlink control channel among the first beam and the second beam and an operation of monitoring the downlink control channel using the selected beam. The operation of selecting may include selecting a beam corresponding to a downlink control channel in which a search space set to which the downlink control channel belongs is a common search space, selecting a beam corresponding to a downlink control channel in which an identifier of a control resource set (CORESET) has a small value, selecting a beam corresponding to a downlink control channel first located in a time axis, selecting a beam corresponding to a downlink control channel associated with a specific radio network temporary identifier (RNTI), or selecting a beam corresponding to a downlink control channel indicated by the base station.

According to an embodiment of the disclosure, the operation of determining may include determining that the downlink control channel is able to be monitored in case that the user equipment further may include an antenna array to form the second beam in addition to the antenna array to form the first beam.

According to an embodiment of the disclosure, the antenna array is a unit to form one beam, and each of the antenna arrays included in the user equipment may include a plurality of antenna elements.

According to an embodiment of the disclosure, if the downlink control channel is determined to be able to be monitored, the user equipment may monitor the downlink control channel using the second beam.

According to an embodiment of the disclosure, each of the first beam and the second beam may be formed to receive a reference signal of a different antenna port.

A user equipment according to another embodiment of the disclosure includes a transceiver transmitting and receiving signals and a controller configured to receive a downlink signal from a base station using a first beam, determine whether a downlink control channel is able to be monitored using a second beam, and skip the monitoring of the downlink control channel if the downlink control channel is determined to be unable to be monitored using the second beam.

According to an embodiment of the disclosure, control information can be efficiently transmitted and received according to circumstances because a user equipment operates by considering a parameter configured in the user equipment and a communication environment that is flexibly changed together.

Figure 1:
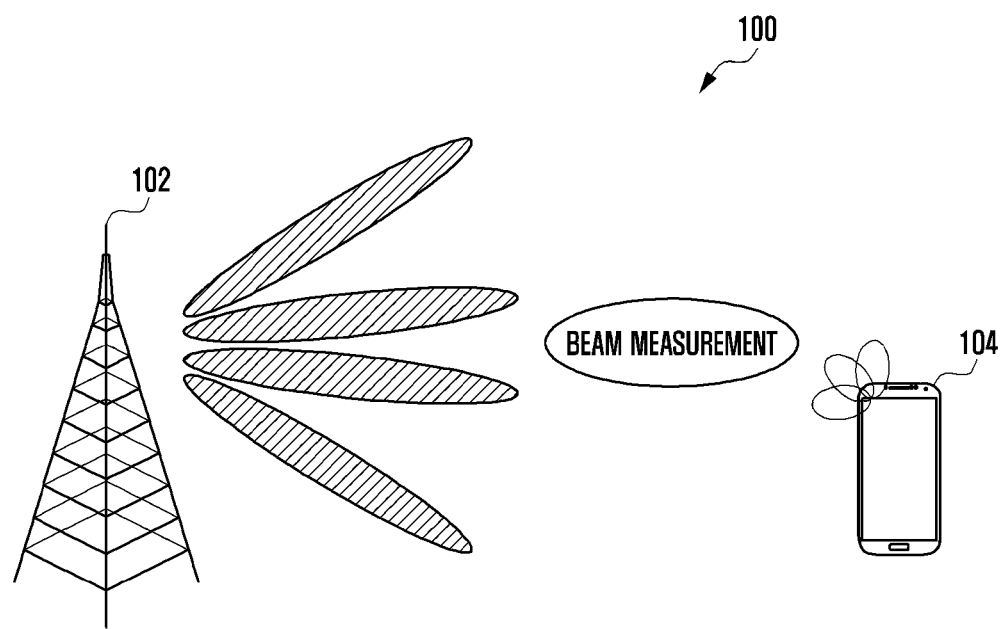
FIG. 1 is a diagram describing a beam measurement process in a 5G communication environment using beamforming.

Hereinafter, preferred embodiments of the disclosure are described in detail with reference to the accompanying drawings. It is to be noted that the same reference numbers are used to refer to the same elements in the accompanying drawings. Furthermore, a detailed description of known functions or constructions that may make the gist of the disclosure vague will be omitted.

In this specification, in describing the embodiments, a description of technology contents that are well known in the art to which the disclosure pertains and that are not directly related to the disclosure is omitted in order to clearly deliver the gist of the disclosure without obscuring the gist of the disclosure by omitting an unnecessary description.

For the same reason, in the accompanying drawings, some elements are enlarged, omitted or schematically depicted. Furthermore, the size of each element does not accurately reflect its real size. In the drawings, the same or similar elements are assigned the same reference numerals.

Advantages and characteristics of the disclosure and a method for achieving the advantages and characteristics will become apparent from the embodiments described in detail in conjunction with the accompanying drawings. However, the disclosure is not limited to the disclosed embodiments, but may be implemented in various different forms. The embodiments are provided to only complete the disclosure and to fully notify a person having ordinary knowledge in the art to which the disclosure pertains of the category of the disclosure. The disclosure is defined by the category of the claims. Throughout the specification, the same reference numerals denote the same elements.

In this case, it will be understood that each of the blocks of the flowchart drawings and combinations of the blocks of the flowchart drawings can be executed by computer program instructions. These computer program instructions may be mounted on the processor of a general purpose computer, a special purpose computer or other programmable data processing apparatus, so that the instructions executed by the processor of the computer or other programmable data processing apparatus create means for executing the functions specified in the flowchart block(s). These computer program instructions may also be stored in a computer-usable or computer-readable memory that can direct a computer or other programmable data processing equipment to implement function in a particular manner, such that the instructions stored in the computer-usable or computer-readable memory produce an article of manufacture including instruction means that implement the function specified in the flowchart block(s). The computer program instructions may also be loaded on a computer or other programmable data processing apparatus to cause a series of operational steps to be performed on the computer or other programmable data processing apparatus to produce a computer-executed process, so that the instructions performing the computer or other programmable data processing apparatus may provide steps for executing the functions described in the flowchart block(s).

Furthermore, each block of the flowchart drawings may represent a portion of a module, a segment or code, which includes one or more executable instructions for implementing a specified logical function(s). It should also be noted that in some alternative implementations, the functions noted in the blocks may be performed out of order. For example, two blocks shown in succession may in fact be executed substantially concurrently or the blocks may sometimes be executed in the reverse order, depending upon the functionality involved.

In this case, the term "unit", as used in the present embodiment means software or a hardware component, such as a field programmable gate array (FPGA) or an application-specific integrated circuit (ASIC), and the "unit" performs specific tasks. However, the meaning of "~unit" is not limited to software or hardware. The "unit" may advantageously be configured to reside on an addressable storage medium and configured to operate on one or more processors. Accordingly, the "unit" may include, for example, components, such as software components, object-oriented software components, class components, and task components, processes, functions, attributes, procedures, sub-routines, segments of program code, drivers, firmware, microcode, circuitry, data, databases, data structures, tables, arrays, and variables. The functionalities provided in the components and "units" may be combined into fewer components and "units" or may be further separated into additional components and "units." Furthermore, the components and "units" may be implemented to operate on one or more CPUs within a device or a security multimedia card.

FIG. 1 is a diagram describing a beam measurement process in a 5G communication environment 100 using beamforming. As described above, in a next-generation communication system, in order to achieve a high data transfer rate, a scheme using an ultra-high frequency band is being discussed. A high frequency band used in such a next-generation communication system has a relatively severe path loss. Accordingly, in order to increase the transfer distance of a radio wave, to perform communication using a narrow beam by applying beamforming is being discussed.

In a wireless communication system using beamforming described with reference to FIG. 1, a beam pair link (BPL) configured with the transmission beam of a transmission stage and the reception beam of a reception stage is used for data transmission and reception between a terminal (or, a user equipment (UE)) and a base station (BS). If beamforming is applied, it is important to find out an optimal beam between a UE 104 and a BS 102 because a beam is narrowly formed to have directivity. In particular, if the UE moves, it is necessary for the BS and the UE to find out an optimal beam to be used for communication and to share information on the optimal beam because a channel environment may be changed from time to time. A process of finding out an optimal beam as described above is called a beam measurement process. The UE and the BS find out an optimal beam to be used for communication while sweeping (or changing) the transmission beam and the reception beam.

Figure 2:
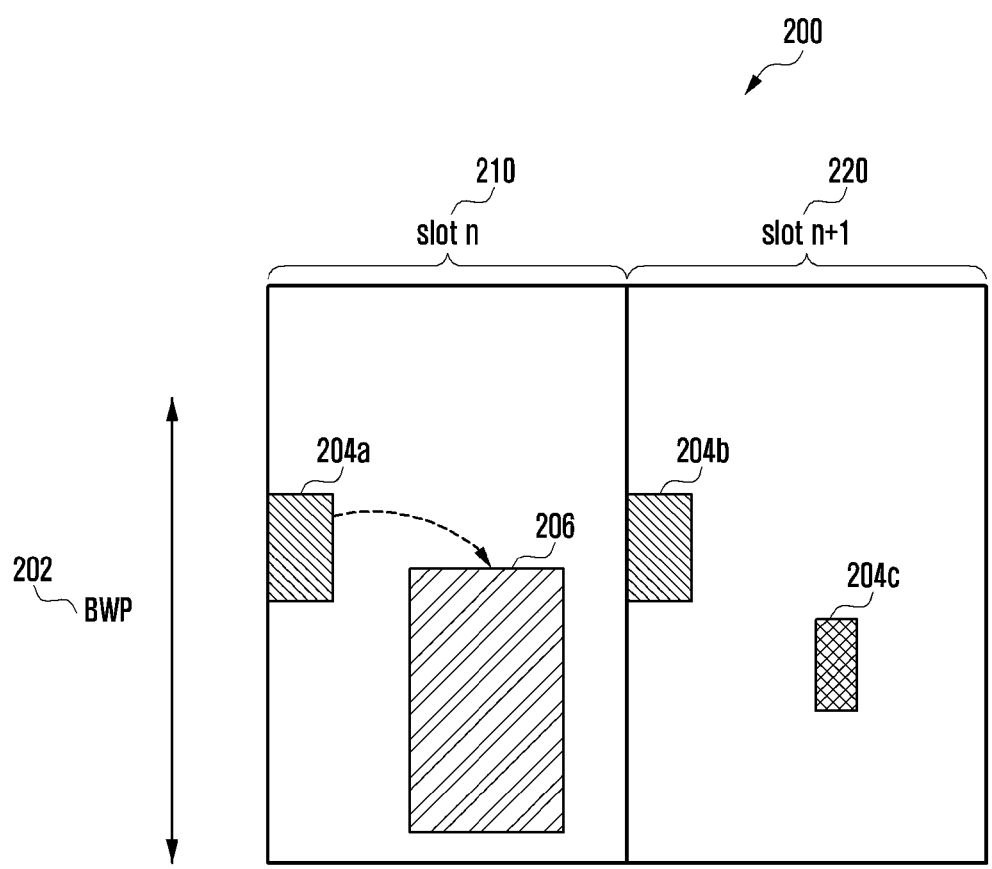
FIG. 2 is a diagram describing a bandwidth part (BWP), a control resource set (CORESET) and a search space set configured in a user equipment.

FIG. 2 is a diagram describing an example 200 of a radio resource for describing a bandwidth part (BWP), a control resource set (CORESET) and a search space set configured in a user equipment.

At least one bandwidth part (BWP) 202 may be configured in a UE that operates in the aforementioned communication system (or 5G communication system) using beamforming. The UE performs transmission and reception within only the configured BWP. Such a BWP configuration is performed in a UE-specific manner, and a BWP configured in each UE may be independently present within a frequency band supported by a BS.

Furthermore, a maximum of three control resource sets (CORESETs) 204a, 204b, and 204c may be configured for each BWP. A maximum of 10 search space sets may be configured for each BWP. The UE may receive downlink data from the BS in a specific radio resource 206 or transmit uplink data to the BS by receiving control information received through a search space set associated with the CORSET. As described above, the radio resource 206 scheduled by the control information may be located within a slot 210 in which the control information is received, and may be located in another slot 220 in a time axis.

Meanwhile, a UE may receive a parameter for configuring a CORESET, such as Table 1, through radio resource control (RRC) signaling. Furthermore, the UE may receive a parameter for configuring a search space set, such as Table 2, through RRC signaling.

TABLE 1

| | |
|---|---|
| CORESET-ID | a control resource set index |
| PDCCH-DMRS-Scrambling-ID | a DM-RS scrambling sequence initialization value |
| CORESET-time-duration | a number of consecutive symbols |
| CORESET-freq-dom | a set of resource blocks |
| CORESET-CCE-to-REG-mapping-type | a CCE-to-REG mapping |
| CORESET-REG-bundle-size | a REG bundle size, in case of interleaved CCE-to-REG mapping |
| CORESET-shift- index | a cyclic shift for the REG bundle interleaver |
| TCI-StatesPDCCH | quasi co-location information of the DM-RS antenna port for PDCCH reception |
| TCI-PresentInDCI | an indication for a presence or absence of a transmission configuration indication (TCI) field for DCI format 1_0 or DCI format 1_1 transmitted by a PDCCH in control resource set, |

TABLE 2

| | |
|---|---|
| CORESET-ID | an association between a search space set and a control resource set |
| Common-search-space-flag | an indication that the search space set is a common search space set or a UE-specific search space set |
| RNTI-monitoring | (if the search space set is for a common search space) to monitor PDCCH for one or more of DCI format 0_0 and DCI format 1_0 with CRC scrambled by a RNTI from RNTIs described in [5, TS 36.212], DCI format 2_0, DCI format 2_1, DCI format 2_2, and DCI format 2_3 |
| USS-DCI-format | (if the search space set is a UE-specific search space) to monitor PDCCH either for DCI format 0_0 and DCI format 1_0, or for DCI format 0_1 and DCI format 1_1 |
| aggregationLevel1, aggregationLevel2, aggregationLevel4, aggregationLevel8, and aggregationLevel16 | a number of PDCCH candidates per CCE aggregation level |
| monitoringSlotPeriodicityAndOffset | a PDCCH monitoring periodicity(slots) |
| monitoringSlotPeriodicityAndOffset | a PDCCH monitoring offset(slots) |
| monitoringSymbolsWithinSlot | a PDCCH monitoring pattern within a slot, indicating first symbol(s) of the control resource set within a slot for PDCCH monitoring |

A 5G UE may determine whether to monitor a physical downlink control channel (PDCCH) using what beam on what time-frequency resource through signaling for configuring the parameter described in Table 1 and Table 2, and may monitor the PDCCH on a corresponding radio resource.

Meanwhile, if the 5G UE has received control information that schedules a physical downlink shared channel (PDSCH) as a result of the execution of the PDCCH monitoring, it may perform an operation for receiving the corresponding PDSCH. As an example of such an operation, the UE may perform an operation of determining through which beam the PDSCH is transmitted, and may determine a beam through which the PDSCH is transmitted using a method, such as Table 3 below, for example.

hereinafter may mean a specific transmission beam formed by a BS. Meanwhile, a UE may previously determine, manage and retain a reception beam associated for each transmission beam of the BS.

Meanwhile, "Threshold-Sched-Offset", that is, a value defined based on performance or the capability of a UE, means a time interval necessary to change a beam formed by the UE. It is meant that a UE having a great "Threshold-Sched-Offset" value requires a relatively longer time in order to change a reception beam, whereas a UE having a small corresponding value may change a reception beam at a shorter interval. Such a "Threshold-Sched-Offset" value may be related to a time offset between a PDCCH and a PDSCH indicated by the downlink grant of the PDCCH. The

TABLE 3

| | |
|---|---|
| A PDSCH scheduled through a PDCCH received in a CORESET in which TCI-PresentInDCI has not been configured | Follow the TCI-state of a CORESET in which the PDCCH has been transmitted |
| A PDSCH scheduled through DCI format 1_0 When a time offset between a PDCCH received in a CORESET in which TCI-PresentInDCI has been configured and a PDSCH scheduled by the PDCCH is greater than or equal to Threshold-Sched-Offset (Threshold-Sched-Offset is UE capability) | Follow a Transmission Configuration Indication value within DCI transmitted through the PDCCH |
| When a time offset between a PDCCH received in a CORESET in which TCI-PresentInDCI has been configured or not configured and a PDSCH scheduled by the PDCCH is smaller than Threshold-Sched-Offset (Threshold-Sched-Offset is UE capability) | Follow the TCI-state of a CORESET having the lowest CORESET-ID of the latest slot |

Meanwhile, in Tables 1 to 3, a transmission configuration indication (TCI) may mean a specific beam to be used for transmission by a BS. In particular, in Table 1, the "TCI-presentInDCI" parameter notifies whether TCI information is included in downlink control information (DCI). "TCI-StatesPDCCH" indicates a specific beam to be used by the BS for PDCCH transmission. One demodulation reference signal (DMRS) antenna port corresponds to a specific radio resource grid, and thus also corresponds to a transmission beam defined to transmit the DMRS of a pattern defined as a corresponding DMRS antenna port. Accordingly, the specific DMRS antenna port directly corresponds to a specific transmission beam defined for the reception of the corresponding DMRS, and thus a TCI-state to be described UE may determine through which beam the PDSCH is transmitted based on the relation between the PDCCH and the PDSCH (e.g., as in Table 3), and may receive the PDSCH.

Furthermore, if the transmission beam of the BS is determined through the CORESET configuration parameter, the UE may determine the reception beam of the UE based on the transmission beam. The location of a PDCCH candidate(s) in the time axis may be determined through a search space set parameter associated with the CORESET. That is, the reception beam of the UE for PDCCH monitoring may be changed or may not be changed depending on a configuration. If the reception beam of the UE for PDCCH monitoring is configured to be changed, the time for the UE to form a beam for monitoring the PDCCH by changing the reception beam may be sufficient. However, a case where time may not be sufficient in relation to the "Threshold-Sched-Offset" value may occur.

In particular, in a 5G communication system, the reception location of a PDSCH in the time axis may be configured very flexibly and dynamically, such as cross-slot scheduling (a method of scheduling a PDSCH or PUSCH in the slot n+k of a slot n), a slot aggregation (a method of scheduling a PDSCH or PUSCH in m slots), or mini-slot scheduling (method of scheduling some symbols within a slot). Furthermore, as described above, a reception beam for receiving data in the PDSCH may also be changed from time to time. Since the PDSCH reception timing is dynamically changed as described above, a case where data reception timing and PDCCH monitoring timing through the PDSCH overlap in the time axis may occur. In this case, beams for the PDSCH reception and the PDCCH monitoring in the time axis may be the same or different. If a UE has to change a reception beam because a configured beam is different, a case where the time for changing the beam is not sufficient may occur.

Figure 3:
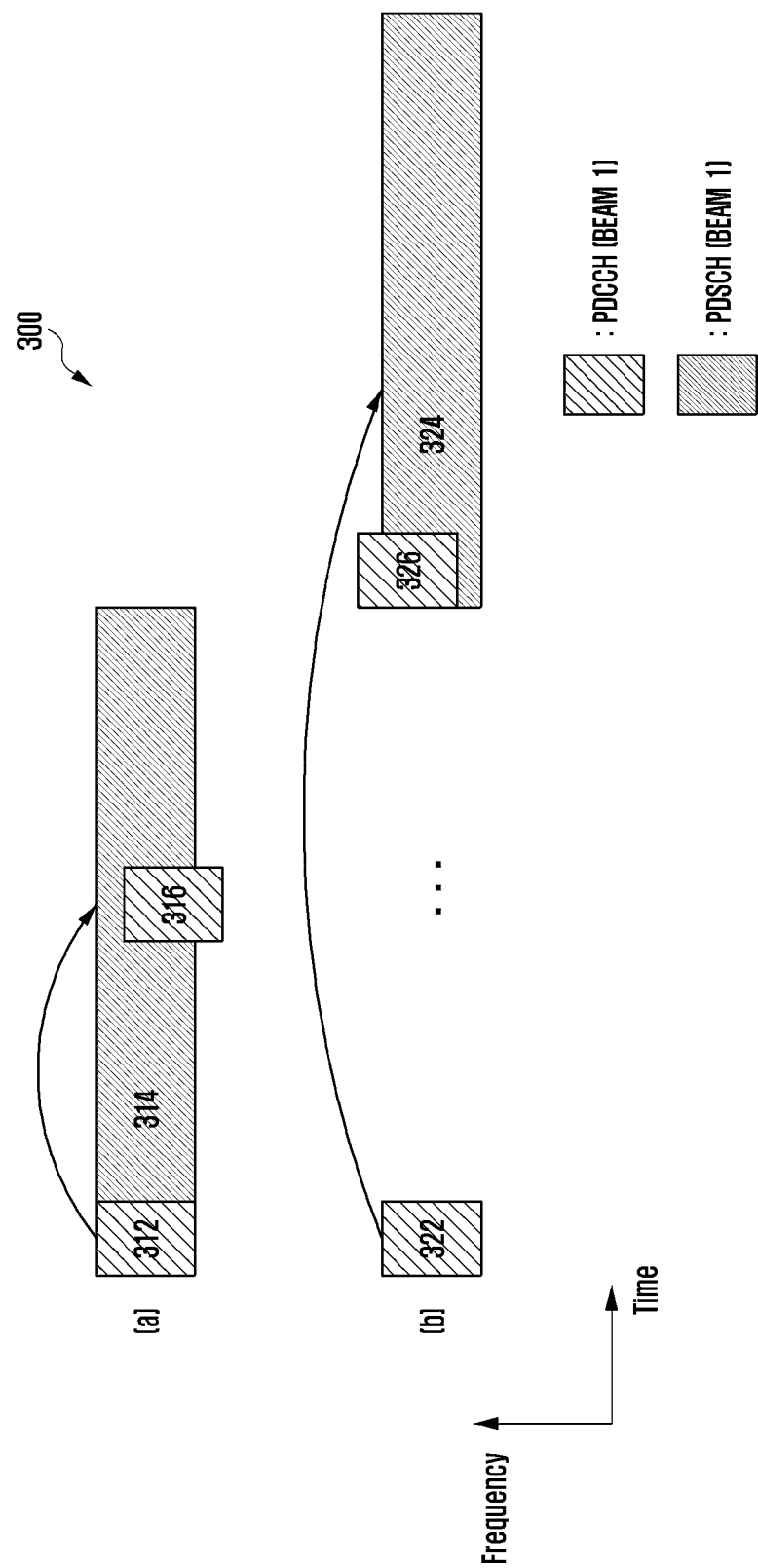
FIG. 3 is a diagram describing an operation of a user equipment in a case where an embodiment of the disclosure is applied.

FIG. 3 is a diagram describing an operation of a UE in a case where an embodiment of the disclosure is applied. FIG. 3 illustrates a process 300 of receiving, by the UE, control information transmitted through a PDCCH from a base station (BS) and receiving data transmitted through a PDSCH on a time-frequency resource. In FIG. 3(a), control information received by the UE by monitoring a PDCCH 312 schedules the reception of data ion a PDSCH 314 (or although not explicitly illustrated in FIG. 3, the PDSCH 314 may be received through a semi-persistent scheduling (SPS) configuration). Meanwhile, the PDSCH 314 scheduled in the UE may overlap another PDCCH 316 to be monitored by the UE in a time axis. That is, the UE monitors the PDCCH based on a CORESET and search space set pre-configured in the UE. A case where the radio resource of a PDSCH scheduled by a specific PDCCH overlaps another PDCCH in the time axis may occur.

In this case, in the embodiment illustrated in FIG. 3(a), the UE may receive the PDCCHs 312 and 314 and the PDSCH 314 using a common beam 1. For example, a CORESET parameter, DCI, etc. may be configured to have the same TCI-state with respect to the PDCCH and the PDSCH or the monitoring timing of all the PDCCHs 312 and 316 in FIG. 3(a) may belong to a search space set mapped to one CORESET. In such a case, the UE does not need to change a beam for receiving the PDSCH 314 and the PDCCH 316. Accordingly, the UE may monitor the PDCCH 316 in another frequency axis while receiving the PDSCH 314.

In the case of, FIG. 3(b), likewise, there is another PDCCH 326 to be monitored within a time interval in which a UE receives a PDSCH 324 scheduled by a PDCCH 322. The UE may monitor the PDCCH 326 while receiving data from the PDSCH 324 without a separate beam change because a beam 1 for monitoring the PDCCH 326 and a beam 1 for receiving the PDSCH 324 are the same.

Figure 4:
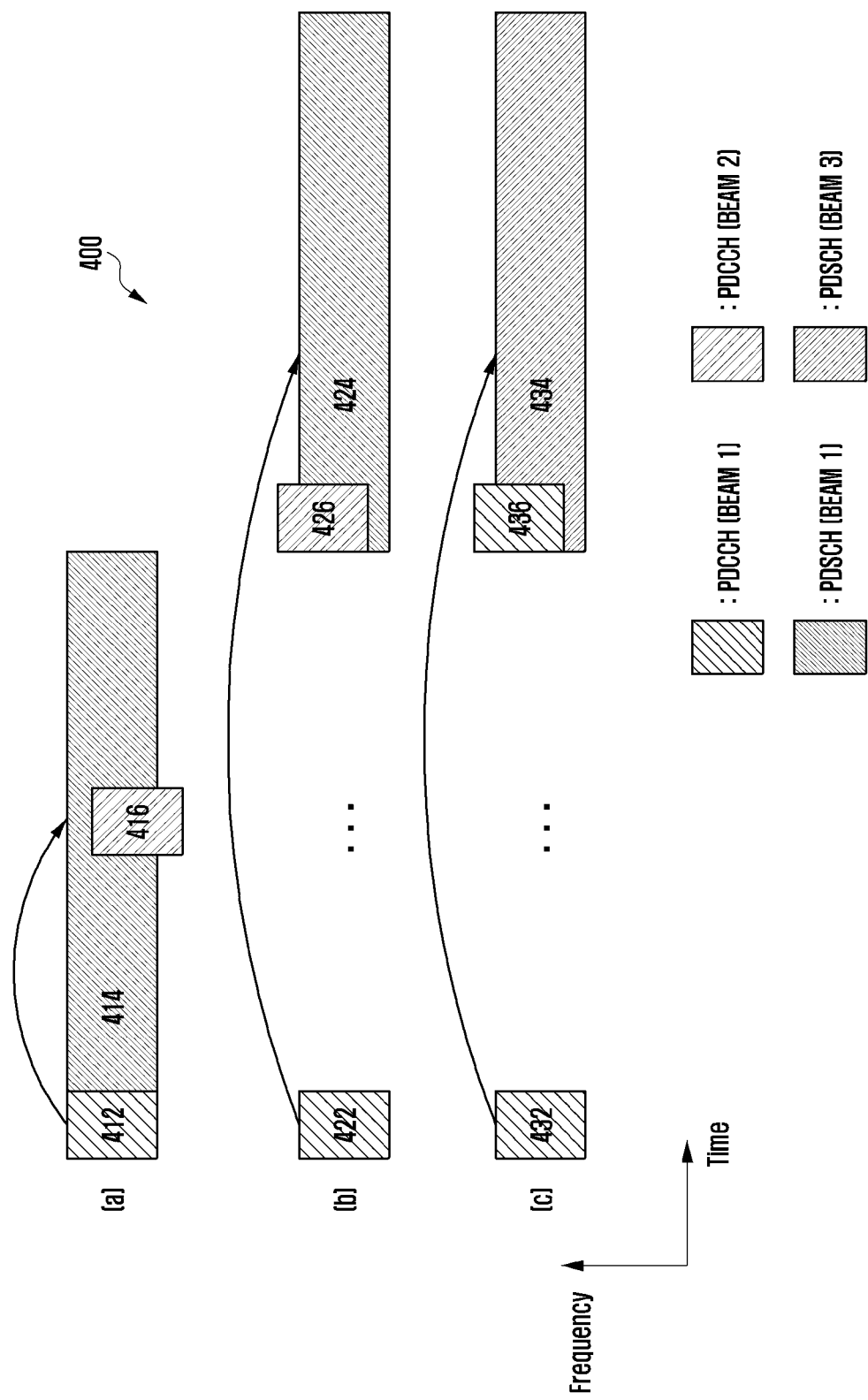
FIG. 4 is a diagram describing an operation of a user equipment in a case where another embodiment of the disclosure is applied.

FIG. 4 is a diagram describing an operation of a UE in a case where another embodiment of the disclosure is applied. Hereinafter, an operation of the UE in each of various situations 400 illustrated in FIG. 4 is described. In FIG. 4(a), timing at which a PDSCH 414 scheduled by a PDCCH 412 is received and timing at which another PDCCH 416 is monitored may overlap in a time axis. In this case, unlike in FIG. 3(a), in FIG. 4(a), a beam 1 for receiving the PDSCH 414 and a beam 2 for receiving the PDCCH 416 may be different. For example, this corresponds to a case where a CORESET is configured so that a PDCCH and a PDSCH have different TCI-states or a case where a PDSCH beam indicator within downlink control information (DCI) designates a beam different from that of a CORESET to which the PDCCH is mapped with respect to the PDSCH. In such a case, a UE may skip or omit the monitoring of the PDCCH 416 that overlaps the PDSCH 414 in the time axis. That is, the UE may skip the monitoring of a PDCCH at the monitoring occasion of the PDCCH 416 that overlaps the scheduled PDSCH 414. As described above, when a situation in which the UE cannot simultaneously receive the PDCCH 416 and the PDSCH 414 occurs although the UE simultaneously operates the beam 1 and the beam 2, if the PDCCH 412 has scheduled the PDSCH 414, this may be considered to have a distinct intention so that the UE receives the PDSCH 414 although a BS has previously configured the PDCCH 416 to be monitored. Accordingly, the UE may skip the monitoring of the PDCCH 416.

In the case of FIG. 4(b), likewise, the time interval of a PDSCH 424 scheduled by a PDCCH 422 and monitoring timing of a PDCCH 416 may overlap in a time axis. Since a beam 2 for monitoring the PDCCH 426 and a beam 1 for receiving the PDSCH 424 are different, a UE may skip the monitoring of the PDCCH 426 that overlaps the PDSCH 424. For another example, in FIG. 4(c), a UE may skip or omit the monitoring of a PDCCH 432 if a beam for receiving a PDSCH 434 scheduled by the PDCCH 432 is a beam 3 different from the beam of the PDCCH 432 and monitoring timing of a PDCCH 436 (beam 1, that is, the same beam as that of the PDCCH 432) overlaps a time interval in which the PDSCH 432 has been scheduled.

Figure 5:
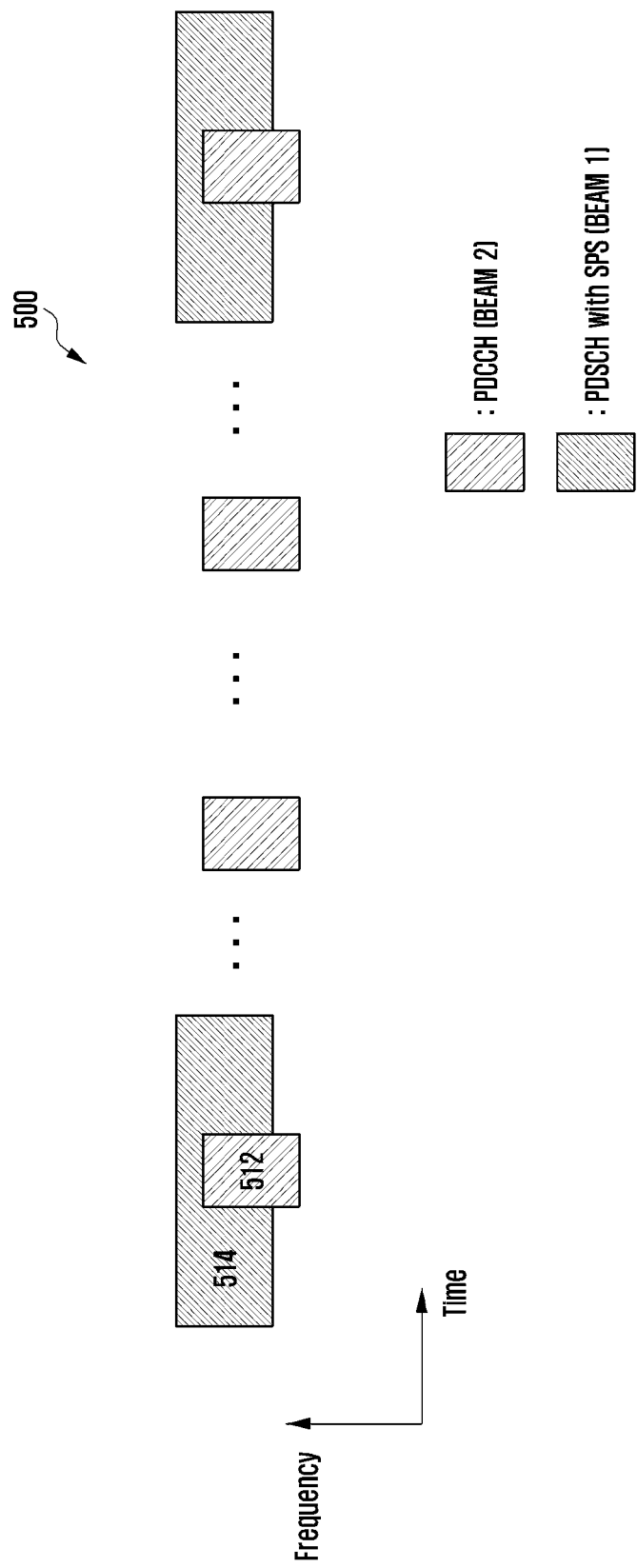
FIG. 5 is a diagram describing an operation of a user equipment in a case where still another embodiment of the disclosure is applied.

FIG. 5 is a diagram describing an operation of a UE in a case where still another embodiment of the disclosure is applied. Hereinafter, an operation of the UE in a situation 500 illustrated in FIG. 5 is described. In FIG. 5, monitoring timing of another PDCCH 512 may overlap a time interval in which a PDSCH 514 received by a downlink SPS configuration is received. In FIG. 5, if the beam 2 of the PDCCH 512 and the beam 2 of a PDSCH 514 received based on an SPS configuration are different (e.g., if a CORESET is configured to have a different TCI-state or a PDSCH beam indicator within DCI designates a beam different from that of the CORESET to which a PDCCH has been mapped), the UE may skip the monitoring of the PDCCH 512. The UE may omit or skip the monitoring of the PDCCH 512 at the monitoring occasion of the PDCCH 512 that overlaps the PDSCH 514 received by a DL SPS configuration.

Figure 6:
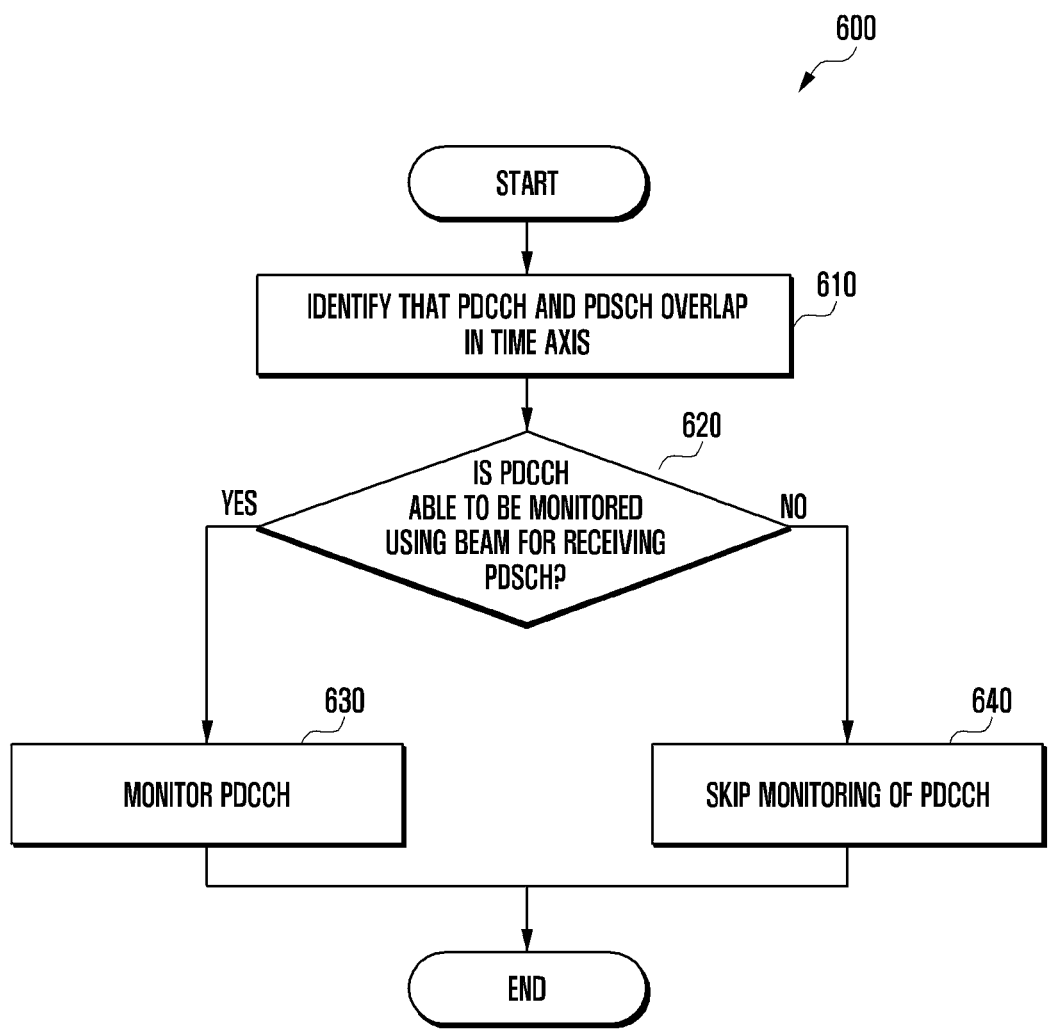
FIG. 6 is a flowchart describing an operation of a user equipment according to an embodiment of the disclosure.

FIG. 6 is a flowchart describing an operation of a UE according to an embodiment of the disclosure. FIG. 6 illustrates, according to a time-series flow, an operation 600 of the UE according to the embodiment described with reference to FIGS. 3 to 5.

The UE 104 (e.g., the terminal controller 1520) identifies that the time interval of a PDSCH scheduled by a PDCCH and monitoring timing of another PDCCH overlap in a time axis (610). The UE 104 (e.g., the terminal controller 1520) identifies whether it can monitor a PDCCH using a beam configured to receive a PDSCH (620). If the beam configured to receive the PDSCH and the beam for monitoring the PDCCH are the same (e.g., in the case of FIG. 3), the UE 104 (e.g., the terminal controller 1520 and a transceiver 1510) may monitor the PDCCH while receiving the PDSCH (630). In contrast, if the two beams are different, the UE 104 (e.g., the terminal controller 1520 and the transceiver 1510) may receive the PDSCH and skip the monitoring of the PDCCH (640).

Figure 7:
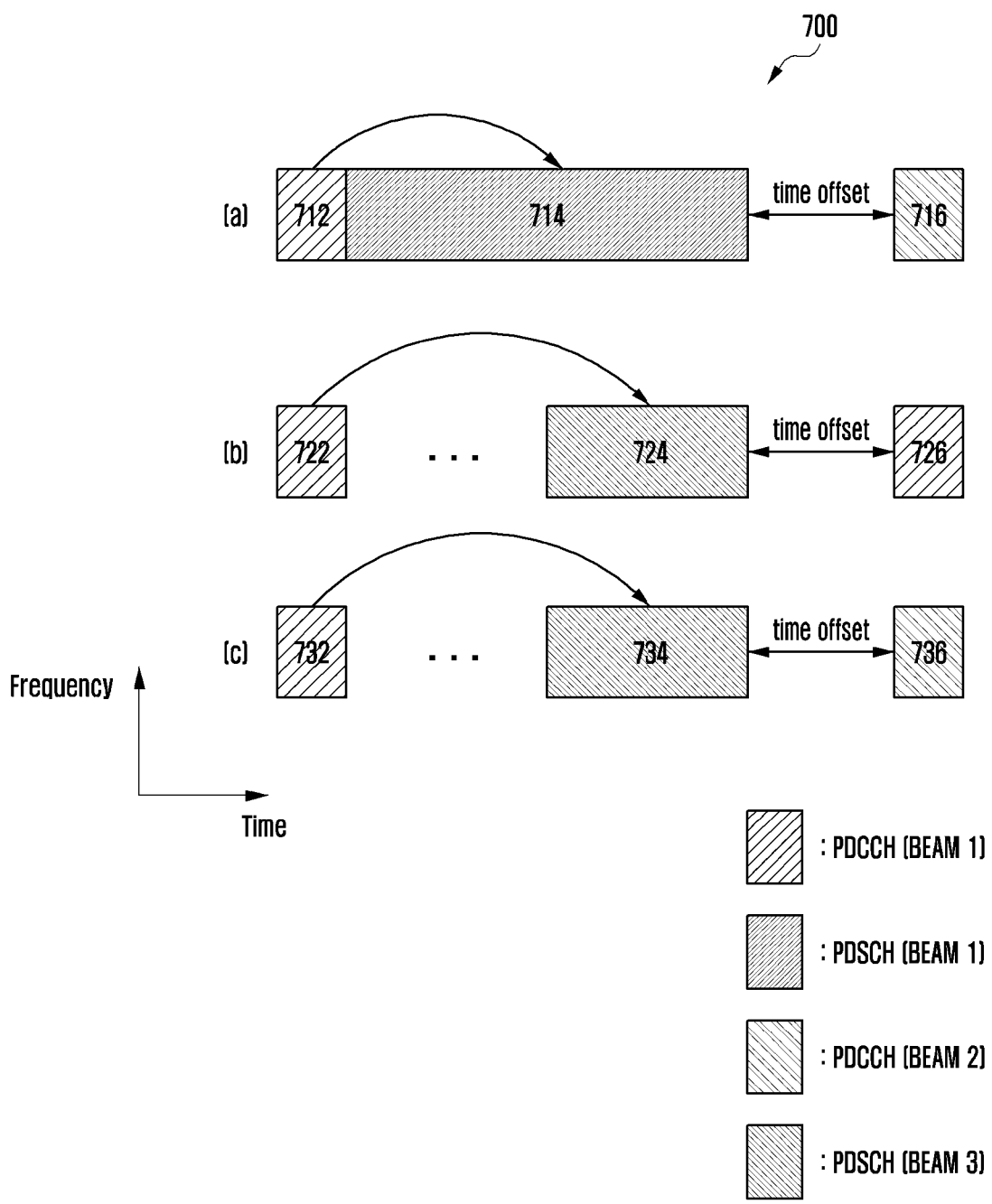
FIG. 7 is a diagram describing an operation of a user equipment in a case where still another embodiment of the disclosure is applied.

FIG. 7 is a diagram describing an operation of a UE in a case where still another embodiment of the disclosure is applied. Hereinafter, operations of the UE in various situations 700 illustrated in FIG. 7 are described. In FIG. 7(a), the UE may receive a PDSCH 714 scheduled by a PDCCH 712, and may monitor another PDCCH 716 after a given time offset. In this case, the beams of the PDSCH 714 and the PDCCH 716 are different (PDSCH 714: a beam 1, and a PDCCH 716: beam 2), but the PDSCH 714 and the PDCCH 716 do not overlap in a time axis, unlike in the aforementioned embodiments. However, if a time offset between monitoring timing of the PDSCH 714 and monitoring timing of the PDCCH 716 is a given threshold value or more (e.g., a value based on "Threshold-Sched-Offset") configured in the UE, that is, if the UE has a sufficient time to change a reception beam, the UE may monitor the PDCCH 716. In contrast, if the corresponding time offset is less than the threshold value, the UE may determine that the time for changing the reception beam is not sufficient and omit or skip the monitoring of the PDCCH 716.

Similarly, in FIG. 7(b), after receiving a PDSCH 724 (beam 2) scheduled by a PDCCH 722 (beam 1), the UE identifies whether monitoring timing of a PDCCH 726 (beam 1) is reached after a given time. In this case, if the beam for receiving the PDSCH 724 and the beam for monitoring the PDCCH 726 are different and a time offset between the reception termination of the PDSCH 724 and the monitoring timing of the PDCCH 726 is less than a threshold value, the UE may skip the monitoring of the PDCCH 726. Even in the case of FIG. 7(c), if the time is not sufficient to change a beam for receiving a PDCCH 736, the UE may skip the monitoring of the PDCCH 736.

Figure 8:
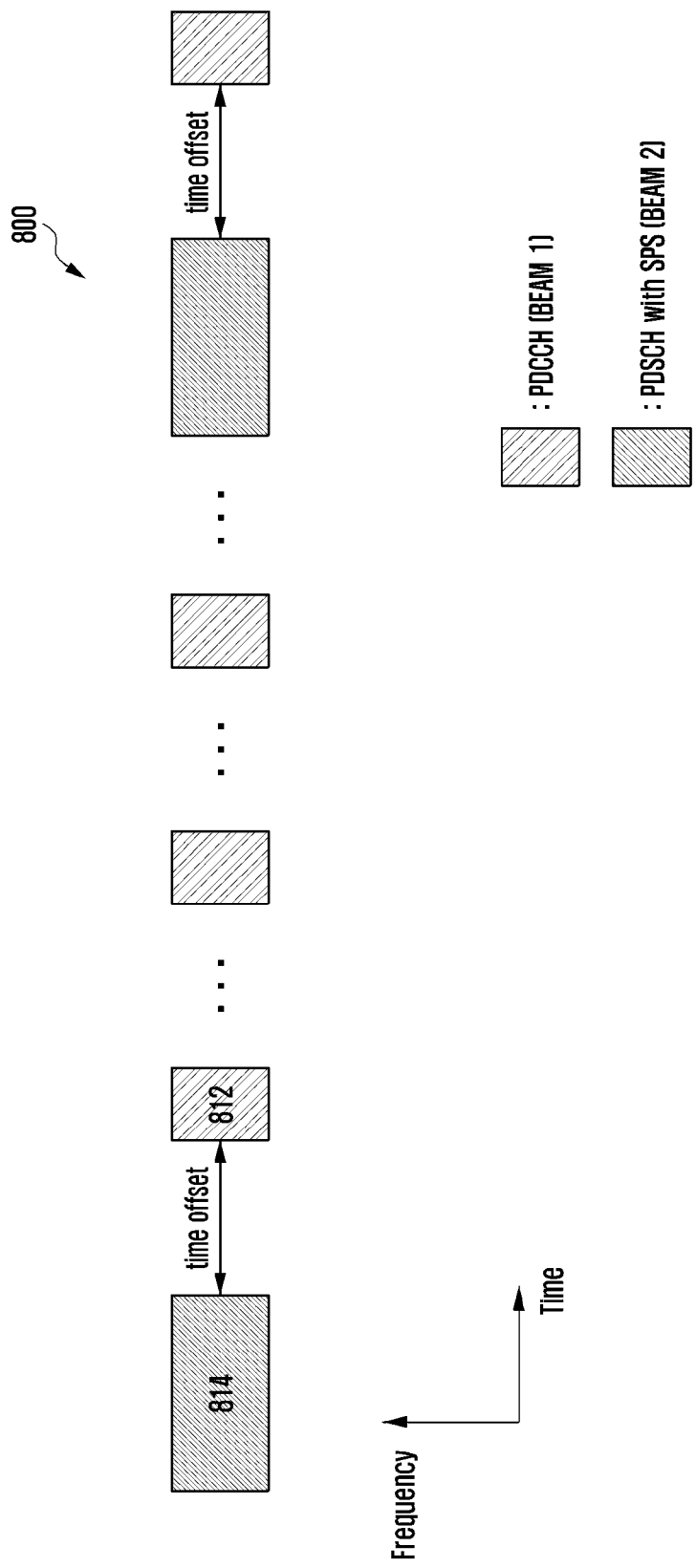
FIG. 8 is a diagram describing an operation of a user equipment in a case where still another embodiment of the disclosure is applied.

FIG. 8 is a diagram describing an operation of a UE in a case where still another embodiment of the disclosure is applied. Hereinafter, an operation of the UE in a situation 800 illustrated in FIG. 8 is described. In FIG. 8, a PDSCH 814 received by a downlink SPS configuration is configured to be received using a beam 2. In this case, after the UE receives the PDSCH 814, when timing at which the UE will monitor a PDCCH 812 using a beam 1 approaches after a lapse of a given time, the UE identifies whether a time offset between the reception of the PDSCH 814 and the monitoring timing of the PDCCH 812 is less than a given threshold value. If the beam for receiving the PDSCH 814 and a beam for monitoring the PDCCH 812 are different (e.g., if a CORESET is configured so that the PDSCH and the PDCCH have different TCI-states or a PDSCH beam indicator within DCI configures a beam different from that of a CORESET to which the PDCCH has been mapped), when a time offset between a PDSCH resource based on an SPS configuration and the monitoring timing of the PDCCH is less than the threshold value, the UE may skip the monitoring of the PDCCH 812. When the time offset is the threshold value or more, the UE may monitor the PDCCH 812. As described above, the reason why the UE skips the monitoring of the PDCCH after receiving the PDSCH based on the SPS configuration is that the PDSCH reception based on the SPS configuration has been configured based on a specific intention of a BS.

Figure 9:
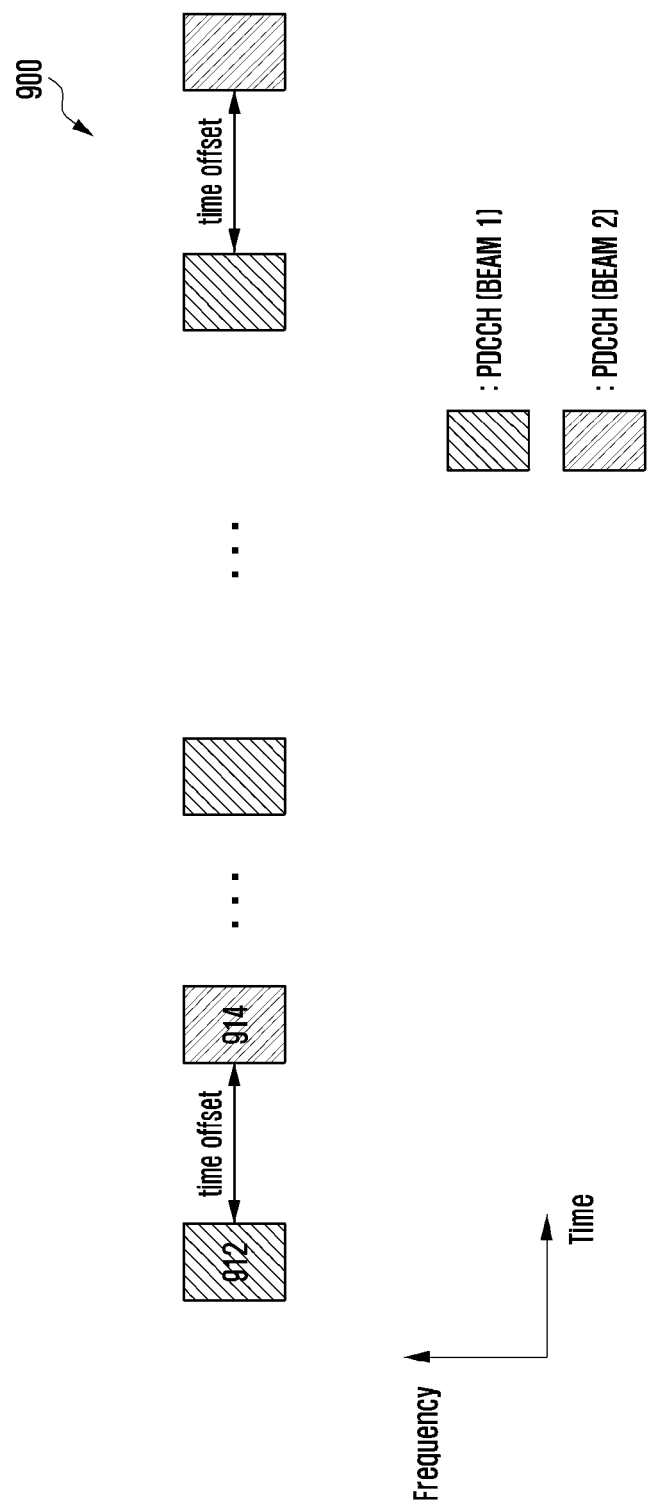
FIG. 9 is a diagram describing an operation of a user equipment in a case where still another embodiment of the disclosure is applied.

FIG. 9 is a diagram describing an operation of a UE in a case where still another embodiment of the disclosure is applied. Hereinafter, an operation of the UE in a situation 900 illustrated in FIG. 9 is described. In the embodiment of FIG. 9, the UE may be configured to monitor a PDCCH using a plurality of beams. In the illustrated embodiment, a radio resource indicated as 912 belongs to a CORESET #p, and the CORESET #p may be mapped to TCI-state-x. In contrast, a radio resource indicated as 914 belongs to a CORESET #p+1, and the CORESET #p+1 may be mapped to TCI-state-y. A time offset between a PDCCH monitoring resource 912 determined by a search space set associated with the CORESET #p and a PDCCH monitoring resource 914 determined by a search space set associated with the CORESET #p+1 may be set at least greater than a specific threshold value (a value based on "Threshold-Sched-Offset" of the UE). In this case, the UE may monitor the PDCCH using a different beam at each PDCCH monitoring occasion.

Figure 10:
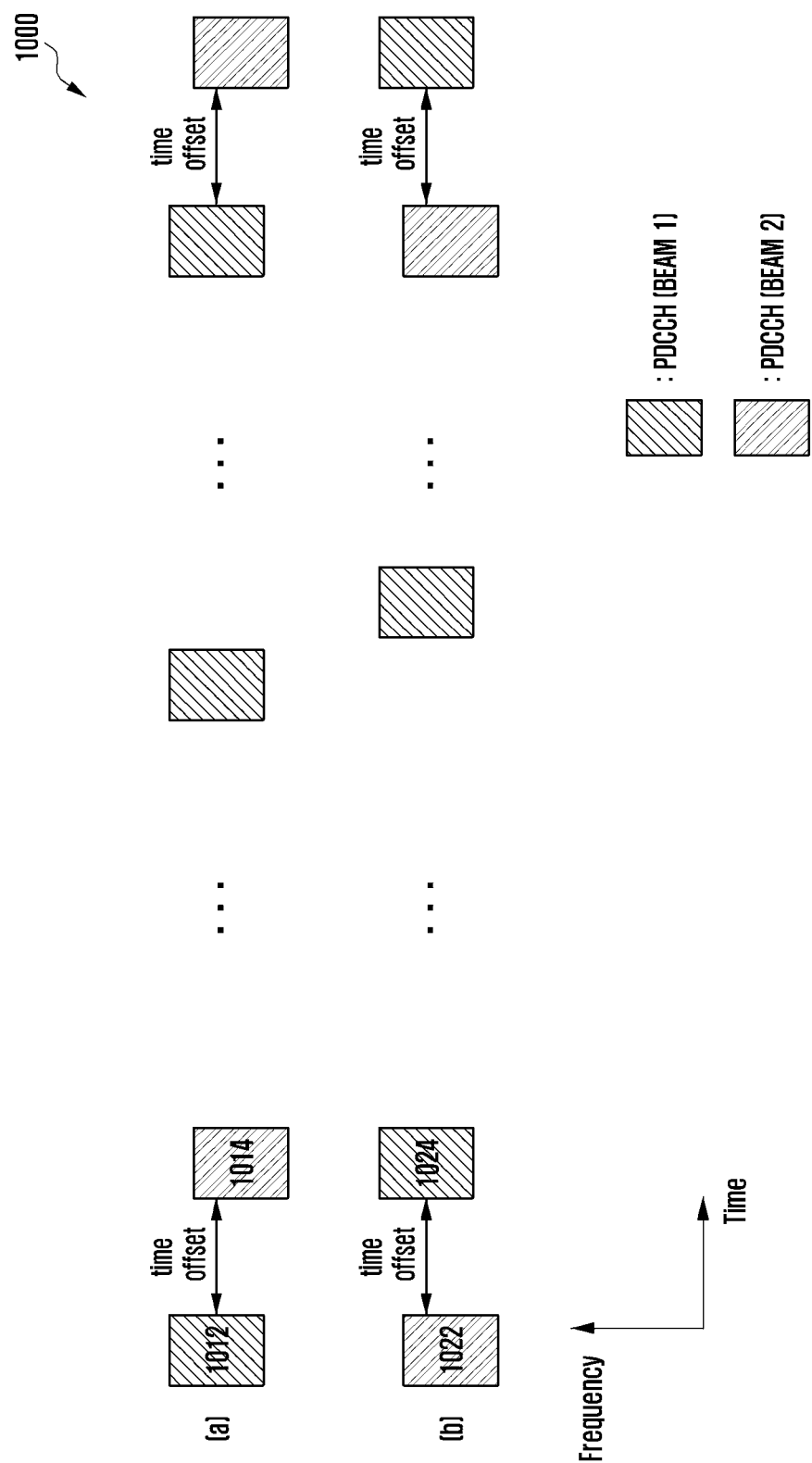
FIG. 10 is a diagram describing an operation of a user equipment in a case where still another embodiment of the disclosure is applied.

FIG. 10 is a diagram describing an operation of a UE in a case where still another embodiment of the disclosure is applied. Hereinafter, an operation of the UE in each of situations 1000 illustrated in FIG. 10 is described. FIG. 10 illustrates a case where when the UE monitors a PDCCH using a plurality of beams, a time offset between the PDCCH monitoring occasion 1012 or 1024 of a search space set associated with a CORESET #p and the PDCCH monitoring occasions 1014 or 1022 of a search space set associated with a CORESET #p+1 is set to be smaller than a threshold value, unlike in the embodiment of FIG. 9. In such a case, the UE may not secure a time sufficient to monitor the PDCCH while changing beams in all of the plurality of PDCCH monitoring occasions (FIGS. 10(a) and 10(b)).

In such a case, the UE may select a TCI-state mapped to the radio resource of a monitoring occasion corresponding to one search space set, among monitoring occasions corresponding to a plurality of search space sets, and may monitor a PDCCH only in the corresponding monitoring occasion. A criterion on which a UE selects a specific PDCCH monitoring resource may be various. For example, the UE may select a PDCCH monitoring occasion (or resource) through a combination of one or more of the following criteria.

if the characteristic of a search space to which a specific PDCCH monitoring resource belongs is a common search space and the characteristic of a search space set to which another PDCCH monitoring resource belongs is a UE-specific search space), the UE may perform PDCCH monitoring in the PDCCH monitoring resource having the characteristic of the common search space.

the UE may perform PDCCH monitoring in a PDCCH monitoring resource in which a CORESET-ID has a smaller value.

the UE may perform PDCCH monitoring in a PDCCH monitoring resource first located in a time axis.

the UE may perform PDCCH monitoring in a PDCCH monitoring resource with which a specific radio network temporary identifier (RNTI) is associated.

A 5G network may configure in which resource a UE will perform PDCCH monitoring through RRC signaling or may notify the UE of it through a medium access control control element (MAC CE). For example, a 5G network may notify a UE of a CORESET-ID to be monitored by the UE through RRC signaling, or may notify the UE of a CORESET-ID to be monitored by the UE through a MAC CE. The UE may perform PDCCH monitoring in a PDCCH monitoring resource including the received CORESET-ID. For another example, a 5G network may notify a UE of an RNTI through RRC signaling, or may notify the UE of RNTI-monitoring through a MAC CE. The UE may perform PDCCH monitoring in a PDCCH monitoring resource associated with the corresponding RNTI.

Figure 11:
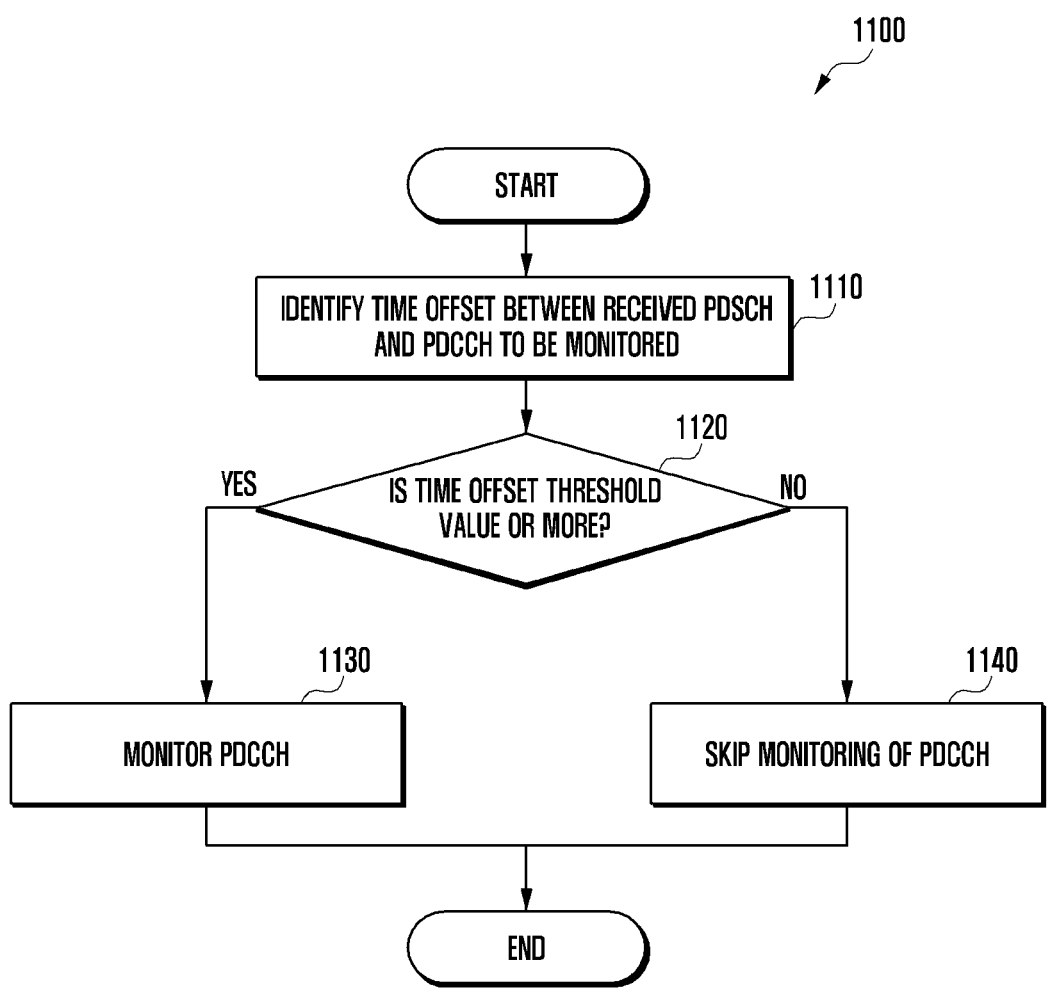
FIG. 11 is a flowchart describing an operation of a user equipment according to another embodiment of the disclosure.

FIG. 11 is a flowchart describing an operation of a UE according to another embodiment of the disclosure. FIG. 11 illustrates, according to a time-series flow, an operation 1100 of the UE according to the embodiments described with reference to FIGS. 7 to 10.

After receiving a PDSCH based on the scheduling of a PDCCH, the UE 104 (e.g., the terminal controller 1520) identifies a time offset between PDSCH reception completion timing and PDCCH monitoring start timing when monitoring timing of another PDCCH is reached (1110). If the measured time offset is a threshold value or more, the UE 104 (e.g., the terminal controller 1520 and the transceiver 1510) changes a beam into a beam for PDCCH monitoring and monitors the PDCCH (1120, 1130). In contrast, if the time offset is less than the threshold value, the UE 104 (e.g., the terminal controller 1520 and the transceiver 1510) may skip the monitoring of the PDCCH (1120, 1140).

Figure 12:
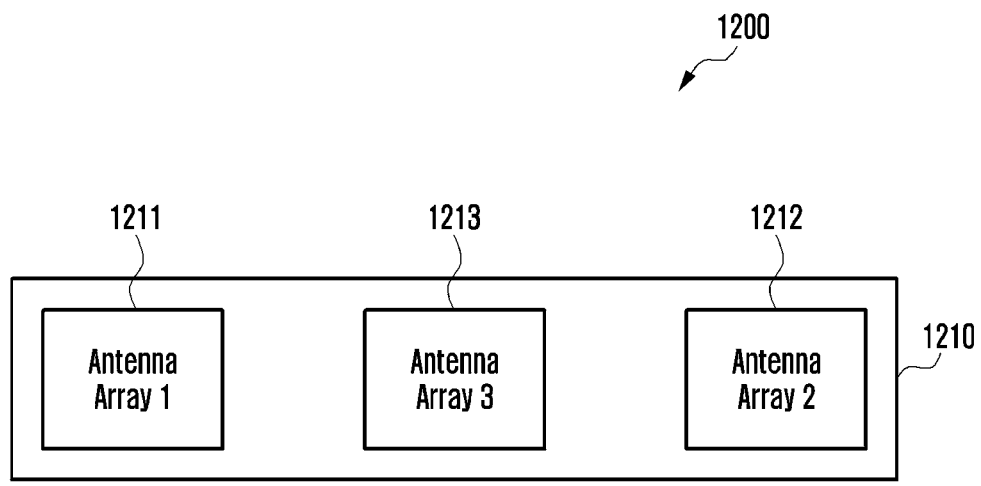
FIG. 12 is a flowchart describing an antenna configuration of a user equipment according to another embodiment of the disclosure.

FIG. 12 is a flowchart describing an antenna configuration of a UE according to another embodiment of the disclosure. The antenna configuration 1200 illustrated in FIG. 12 may be an example in which the transceiver 1510 of a UE 1500 is implemented, and may correspond to an example in which the transceiver 1610 of a BS 1600 described based on a UE is implemented. In FIG. 12, the antenna 1210 of the UE may include one or more mmWave antenna arrays 1211, 1212, and 1213. Each of the mmWave antenna arrays is a unit that forms one reception beam, and may be configured to include a plurality of antenna elements, such as 4×4 and 1×4. A UE including a plurality of antenna arrays may basically communicate with a BS using one antenna array if the TCI-states of CORESETs configured by the BS are the same.

Meanwhile, although a plurality of different TCI-states has been configured by a BS, if a PDCCH has been configured to be monitored through a plurality of beams as in FIG. 9, a UE may operate using one antenna array. In contrast, as in FIG. 10, if a PDCCH has been configured to be monitored through a plurality of beams, a UE may skip the monitoring of the PDCCH in some resources as in the aforementioned embodiment. Alternatively, in the case of FIG. 10, the UE may monitor a PDCCH in a different PDCCH monitoring resource using each beam in a different antenna array through a plurality of antenna arrays. In such a case, the UE may not skip the monitoring of a specific PDCCH. If the UE operates using only one of the plurality of antenna arrays and a case, such as FIG. 10, occurs, the UE may operate in a way to enable another antenna array, if necessary.

Figure 13:
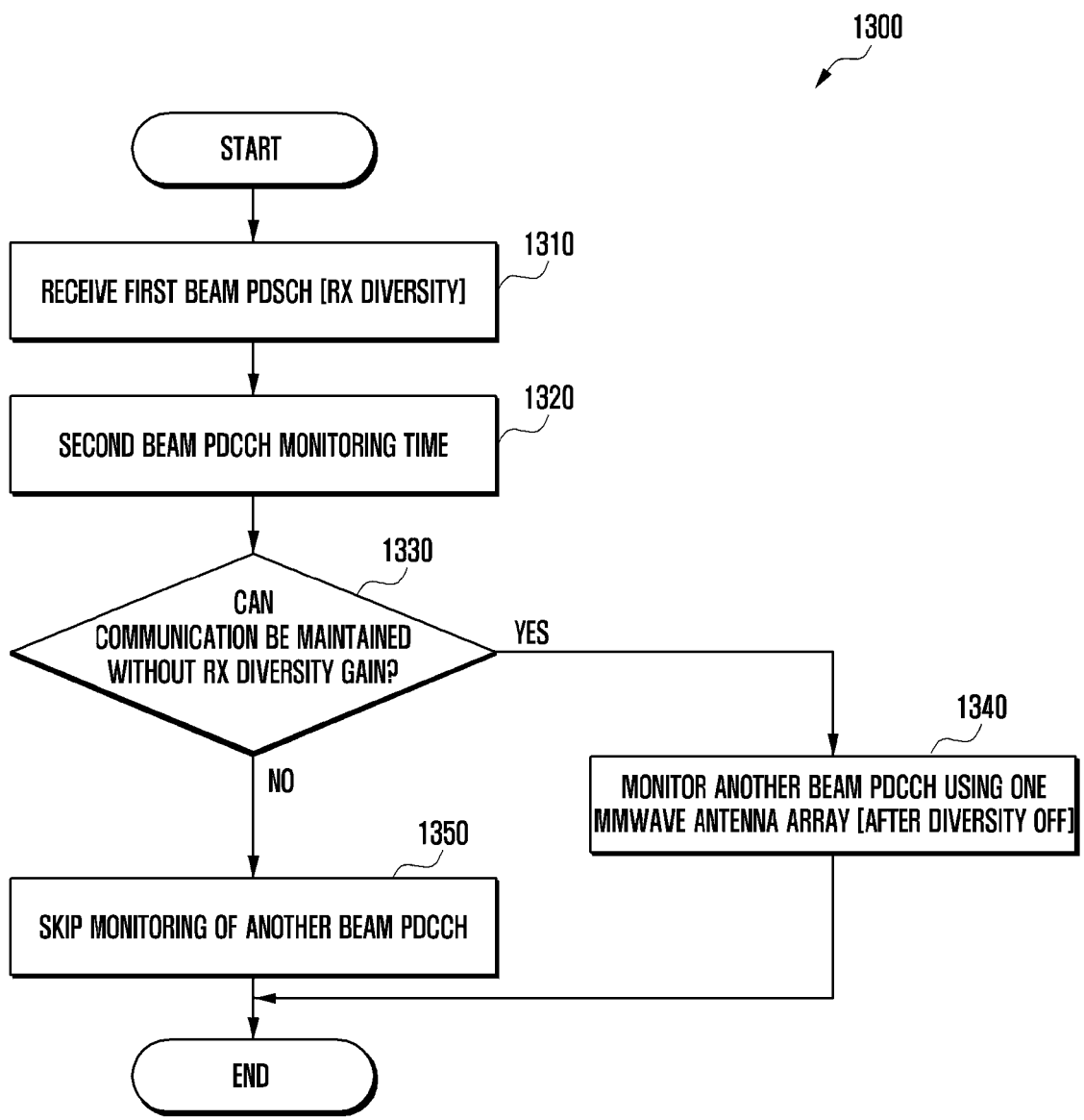
FIG. 13 is a diagram describing an operation of a user equipment according to another embodiment of the disclosure.

FIG. 13 is a diagram describing an operation 1300 of a UE according to another embodiment of the disclosure. FIG. 13 describes, according to a time-series flow, an example of an operation of the UE including a plurality of mmWave antenna arrays as in FIG. 12.

The UE 104 (e.g., the terminal controller 1520 and the transceiver 1510) receives a PDSCH using a first beam, while also operating a plurality of antenna arrays (1310). As described above, Rx diversity may occur because the plurality of antenna arrays operates the same beam. Next, when PDCCH monitoring timing using a second beam is identified (1320), the UE 104 (e.g., the terminal controller 1520) determines whether communication with the BS 102 can be maintained without a reception (Rx) diversity gain (1330). If a communication environment with the BS 102 is sufficiently good and thus the communication can be maintained although a reception diversity gain is not present, the UE 104 (e.g., the terminal controller 1520 and the transceiver 1510) may change the reception beam of one of the operating antenna arrays, and may monitor a PDCCH through the second beam (1340). In such a case, the reception diversity gain no longer occurs. In contrast, if the communication environment with the BS 102 is not sufficient and the UE 104 (e.g., the terminal controller 1520 and the transceiver 1510) changes the beam of a specific antenna array because a reception diversity gain is necessary, the UE 104 may skip the monitoring of a PDCCH using another beam (1350) because the communication with the BS 102 may not be smoothly performed. Meanwhile, at step 1340, the UE 104 (e.g., the terminal controller 1520) may use an automatic gain control (AGC) value, applied when the diversity gain occurred, for the PDCCH monitoring operation without any change, and may use the corresponding AGC value as the start point of an AGC operation for the PDCCH monitoring.

When the UE 104 (e.g., the terminal controller 1520 and the transceiver 1510) includes 3 antenna arrays as in FIG. 12 and operates using the antenna array 1 1211 and the antenna array 2 1212 (e.g., multiple-input multiple-output (MIMO), Rx diversity, or a carrier aggregation (CA)), the UE 104 (e.g., the terminal controller 1520 and the transceiver 1510) may monitor a PDCCH using another beam through the antenna array 3 1213. In this case, with respect to the antenna array 3 1213 physically located in the middle of the antenna arrays 1 and 2 1211 and 1212, the UE 104 (e.g., the terminal controller 1520) may use an AGC value, used in the antenna arrays 1 and 2 and generated through interpolation, for the AGC operation of the antenna array 3 1213.

According to another embodiment, the UE 104 (e.g., the terminal controller 1520 and the transceiver 1510) performing communication in a plurality of component carriers may monitor a PDCCH in each of the plurality of component carriers. In this case, if TCI-states between CORESETs configured in the respective component carriers are the same, the UE 104 (e.g., the terminal controller 1520 and the transceiver 1510) may monitor the PDCCH within the plurality of component carriers using one antenna array. If the TCI-states of CORESETs configured in the respective component carriers are different, the UE 104 (e.g., the terminal controller 1520 and the transceiver 1510) may monitor the PDCCH in each of the component carriers using a plurality of antenna arrays. Although the TCI-states of the CORESETs configured in the respective component carriers are different, if the UE 104 can form one beam at one piece of timing, the UE 104 (e.g., the terminal controller 1520) may enable and operate only one antenna array. For example, in the case of an intra-frequency CA or if a frequency difference including the bandwidth of each component carrier is within a bandwidth which may be processed by one modem, the UE 104 (e.g., the terminal controller 1520 and the transceiver 1510) may monitor a PDCCH in the plurality of component carriers by enabling one antenna array.

Figure 14:
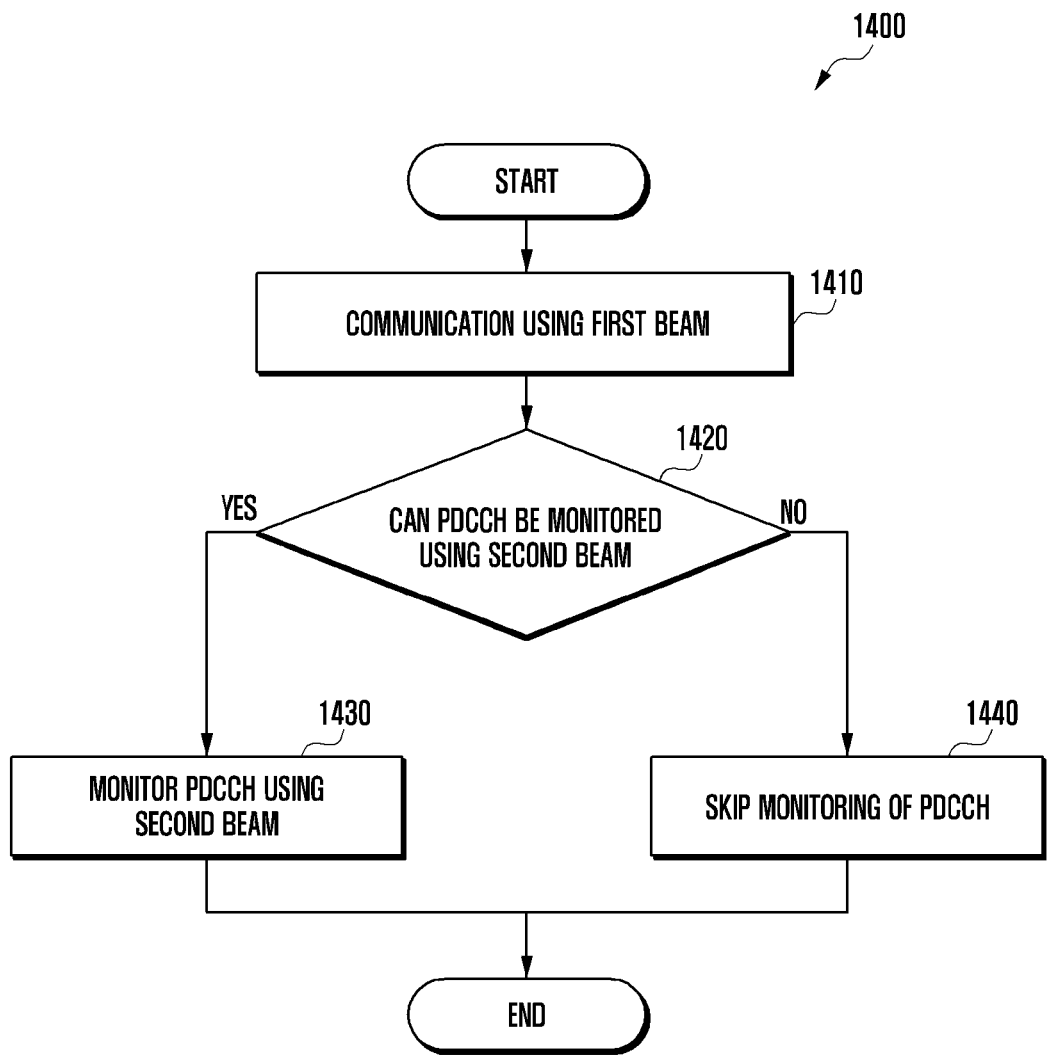
FIG. 14 is a diagram describing an operation of a user equipment according to another embodiment of the disclosure.

FIG. 14 is a diagram describing an operation of a UE according to another embodiment of the disclosure. An operation 1400 of the UE according to the aforementioned embodiments is described with reference to FIG. 14. First, the UE 104 (e.g., the terminal controller 1520) performing communication using a first beam (1410) determines whether it can monitor a PDCCH using a second beam at PDCCH monitoring timing (1420). If the UE 104 (e.g., the terminal controller 1520) can monitor the PDCCH using the second beam (e.g., if the first beam and the second beam are the same, time for changing the first beam into the second beam is sufficient, or an antenna array that will form the second beam is present), the UE 104 (e.g., the terminal controller 1520 and the transceiver 1510) monitors the PDCCH using the second beam (1430). In contrast, if the UE 104 (e.g., the terminal controller 1520) cannot monitor the PDCCH using the second beam (e.g., if the first beam and the second beam are different, time for changing the first beam into the second beam is not sufficient, or an antenna array for the second beam is not present), the UE 104 (e.g., the terminal controller 1520 and the transceiver 1510) may omit or skip the monitoring of the PDCCH.

Figure 15:
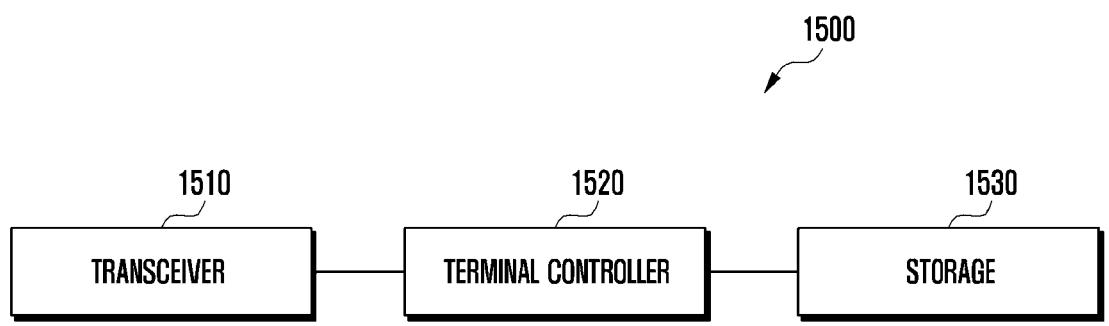
FIG. 15 is a diagram illustrating the structure of a user equipment according to an embodiment of the disclosure.

FIG. 15 is a diagram illustrating a structure 1500 of a UE according to an embodiment of the disclosure. The structure 1500 of the UE illustrated in FIG. 15 may be an example of the configuration of the UE 104 described with reference to FIG. 1. Referring to FIG. 15, the UE may include a transceiver 1510, a terminal controller 1520, and a storage 1530. In the disclosure, the terminal controller 1520 may be defined as a circuit or an application-specific integrated circuit or at least one processor.

The transceiver 1510 transmits and receives signals to or from a different network entity. The transceiver 1510 may receive a downlink signal for beam measurement from a BS or transmit beam failure-related information to the BS, for example. The transceiver 1510 may be implemented in the form of an RF unit including a modem.

The terminal controller 1520 may control an overall operation of the UE according to an embodiment proposed in the disclosure. For example, the terminal controller 1520 may control the transceiver 1510 and the storage 1530 to perform the operations according to the embodiments described with reference to the drawings. Specifically, the terminal controller 1520 may receive, from a BS, a parameter for control information transmitted through a control channel, and may receive control information from a control channel.

The storage 1530 may store at least one of information transmitted and received through the transceiver 1510 and information generated through the terminal controller 1520.

Figure 16:
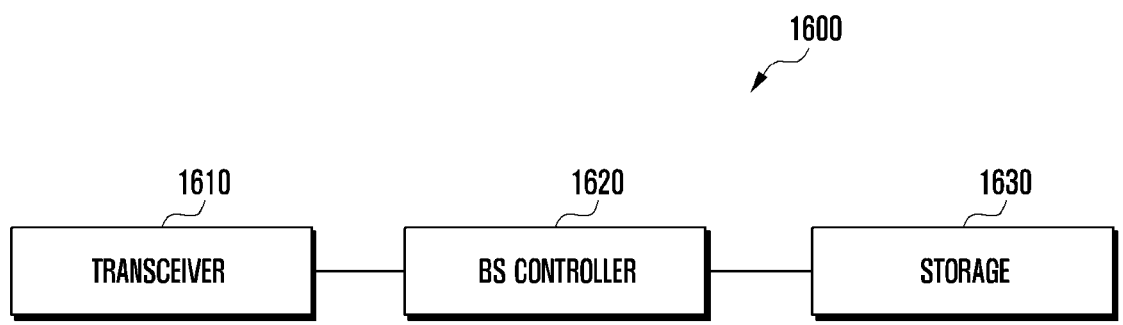
FIG. 16 is a diagram illustrating the structure of a base station according to an embodiment of the disclosure.

FIG. 16 is a diagram illustrating a structure of a base station according to an embodiment of the disclosure. The structure 1600 of the BS illustrated in FIG. 16 may be an example of the configuration of the BS 102 described with reference to FIG. 1. Referring to FIG. 16, the BS may include a transceiver 1610, a BS controller 1620, and a storage 1630. In the disclosure, the BS controller 1620 may be defined as a circuit or an application-specific integrated circuit or at least one processor.

The transceiver 1610 may transmit and receive signals to or from another network entity. The transceiver 1610 may transmit, to a UE, a reference signal for beam measurement, a synchronization signal or a downlink signal, such as a PDCCH, for example. The transceiver 1610 may be implemented in the form of an RF unit including a modem.

The BS controller 1620 may control an overall operation of the BS according to an embodiment proposed in the disclosure. For example, the BS controller 1620 may control the transceiver 1610 and the storage 1630 to perform the operations according to the embodiments described in the drawings. Specifically, the BS controller 1620 may transmit configuration information for transmitting control information to a UE, and may transmit control information to a UE through a control channel.

The storage 1630 may store at least one of information transmitted and receive through the transceiver 1610 and information generated through the BS controller 1620.

Figure 17:
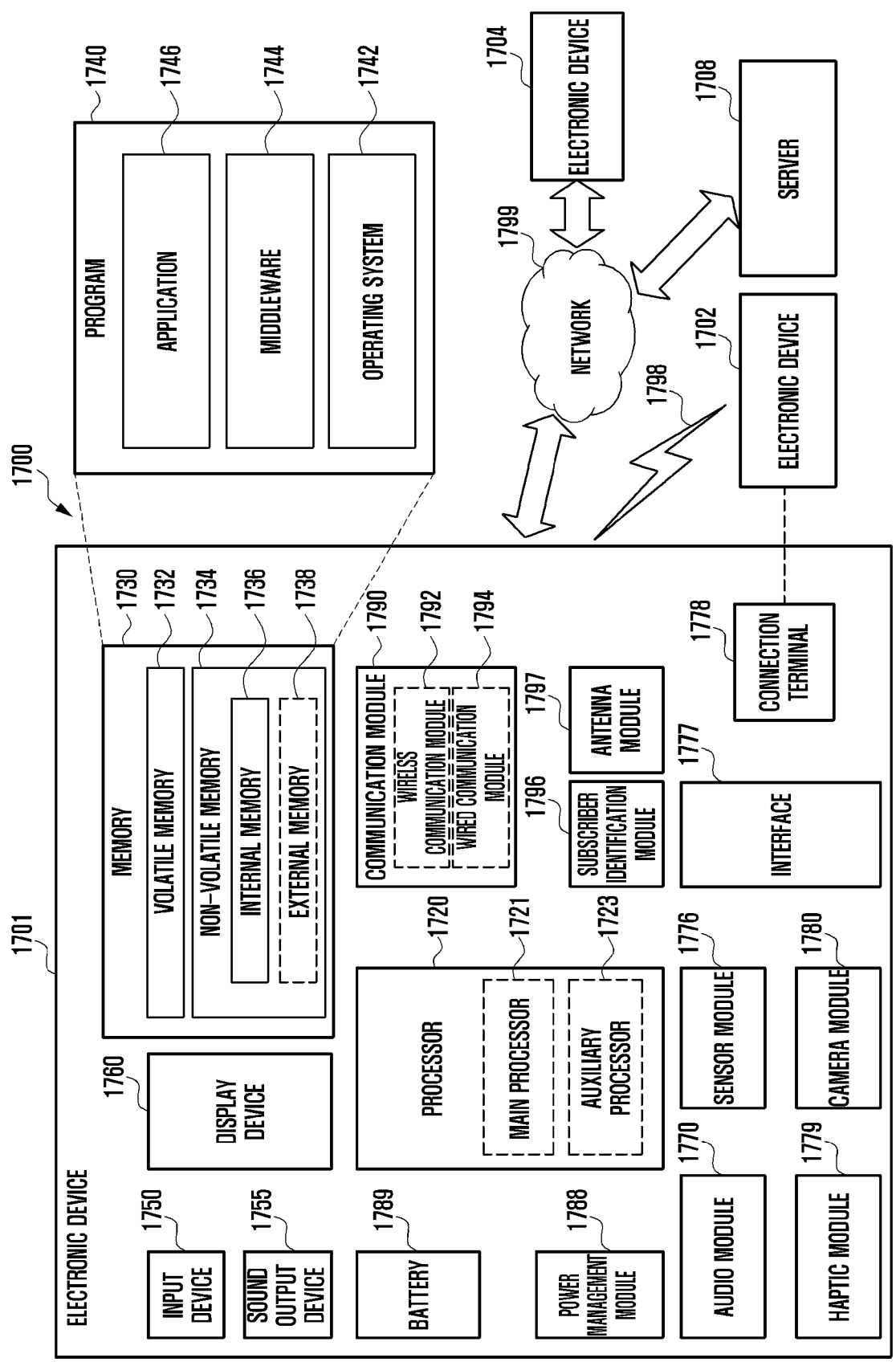
FIG. 17 is a block diagram of an electronic device according to various embodiments in a network environment.

FIG. 17 is a block diagram of an electronic device 1701 within a network environment 1700 according to various embodiments. The electronic device 1701 illustrated in FIG. 17 may be an example of the configuration of the UE 1500 described with reference to FIG. 15. Referring to FIG. 17, in the network environment 1700, the electronic device 1701 may communicate with an electronic device 1702 over a first network 1798 (e.g., a short-distance wireless communication network) or may communicate with an electronic device 1704 or a server 1708 over a second network 1799 (e.g., a long-distance wireless communication network). According to an embodiment, the electronic device 1701 may communicate with the electronic device 1704 through the server 1708. According to an embodiment, the electronic device 1701 may include a processor 1720, a memory 1730, an input device 1750, a sound output device 1755, a display device 1760, an audio module 1770, a sensor module 1776, an interface 1777, a haptic module 1779, a camera module 1780, a power management module 1788, a battery 1789, a communication module 1790, a subscriber identity module 1796, or an antenna module 1797. In an embodiment, at least one (e.g., the display device 1760 or the camera module 1780) of the elements may be omitted from the electronic device 1701 or one or more different elements may be added to the electronic device 1701. In an embodiment, some of the elements may be implemented as one integrated circuit. For example, the sensor module 1776 (e.g., a fingerprint sensor, an iris sensor, or an illuminance sensor) may be embedded and implemented in the display device 1760 (e.g., display).

The processor 1720 may control at least one different element (e.g., hardware or software element) of the electronic device 1701 coupled to the processor 1720 or perform various data processing or operations by executing software (e.g., a program 1740), for example. According to an embodiment, as at least part of a data processing or operation, the processor 1720 may load instructions or data, received from another element (e.g., the sensor module 1776 or the communication module 1790), onto a volatile memory 1732, may process the instructions or data stored in the volatile memory 1732, and may store the resulting data in a non-volatile memory 1734. According to an embodiment, the processor 1720 may include a main processor 1721 (e.g., a central processing unit or an application processor) and an auxiliary processor 1723 (e.g., a graphic processor, an image signal processor, a sensor hub processor, or a communication processor) which may operate independently of or together with the main processor 1721. Additionally or alternatively, the auxiliary processor 1723 may be configured to use lower power than the main processor 1721 or to be specified in a designated function. The auxiliary processor 1723 may be implemented separately from or as a part of the main processor 1721.

The auxiliary processor 1723 may control at least some of functions or states related to at least one element (e.g., the display device 1760, the sensor module 1776, or the communication module 1790) of the elements of the electronic device 1701, instead of the main processor 1721 while the main processor 1721 is in an inactive (e.g., sleep) state or along with the main processor 1721 while the main processor 1721 is in an active (e.g., application execution) state, for example. According to an embodiment, the auxiliary processor 1723 (e.g., an image signal processor or a communication processor) may be implemented as a part of another element (e.g., the camera module 1780 or the communication module 1790) that is functionally related.

The memory 1730 may store various data used by at least one element (e.g., the processor 1720 or the sensor module 1776) of the electronic device 1701. The data may include software (e.g., the program 1740) and input data or output data for a related instruction, for example. The memory 1730 may include the volatile memory 1732 or the non-volatile memory 1734.

The program 1740 may be stored in the memory 1730 as software, and may include an operating system 1742, middleware 1744 or an application 1746, for example.

The input device 1750 may receive, from the outside (e.g., user) of the electronic device 1701, instructions or data to be used for an element (e.g., processor 1720) of the electronic device 1701. The input device 1750 may include a microphone, a mouse, or a keyboard, for example.

The sound output device 1755 may output a sound signal to the outside of the electronic device 1701. The sound output device 1755 may include a speaker or a receiver, for example. The speaker may be used for common uses, such as multimedia playback or recording playback. The receiver may be used to receive an incoming call. According to an embodiment, the receiver may be implemented separately from or as a part of the speaker.

The display device 1760 may visually provide information to the outside (e.g., user) of the electronic device 1701. The display device 1760 may include a control circuit for controlling a display, a hologram device or a projector and a corresponding device, for example. According to an embodiment, the display device 1760 may include a touch circuitry configured to detect a touch or a sensor circuitry (e.g., a pressure sensor) configured to measure the intensity of a force generated by the touch.

The audio module 1770 may convert a sound into an electrical signal or may convert an electrical signal into a sound. According to an embodiment, the audio module 1770 may obtain a sound through the input device 1750 or may output a sound through the sound output device 1755 or an external electronic device (e.g., the electronic device 1702) (e.g., a speaker or a headphone)) directly or wirelessly coupled to the electronic device 1701.

The sensor module 1776 may detect an operating state (e.g., power or temperature) of the electronic device 1701 or an external environment state (e.g., user state), and may generate an electrical signal or data value corresponding to the detected state. According to an embodiment, the sensor module 1776 may include a gesture sensor, a gyro sensor, an atmospheric sensor, a magnetic sensor, an acceleration sensor, a grip sensor, a proximity sensor, a color sensor, an infrared (IR) sensor, a bio sensor, a temperature sensor, a humidity sensor, or an illuminance sensor, for example.

The interface 1777 may support one or more designated protocols which will be used for the electronic device 1701 to be directly or wirelessly coupled to an external electronic device (e.g., the electronic device 1702). According to an embodiment, the interface 1777 may include a high definition multimedia interface (HDMI), a universal serial bus (USB) interface, an SD card interface, or an audio interface, for example.

The connection terminal 1778 may include a connector through which the electronic device 1701 may be physically coupled to an external electronic device (e.g., the electronic device 1702). According to an embodiment, the connection terminal 1778 may include an HDMI connector, a USB connector, an SD card connector, or an audio connector (e.g., a headphone connector), for example.

The haptic module 1779 may convert an electrical signal into a mechanical stimulus (e.g., vibration or motion) or an electrical stimulus which may be recognized by a user through a tactile or kinesthetic sense. According to an embodiment, the haptic module 1779 may include a motor, a piezoelectric element, or an electrical stimulus element, for example.

The camera module 1780 may photograph a still image and a moving image. According to an embodiment, the camera module 1780 may include one or more lenses, image sensors, image signal processors, or flashes.

The power management module 1788 may manage power supplied to the electronic device 1701. According to an embodiment, the power management module 388 may be implemented as at least part of a power management integrated circuit (PMIC), for example.

The battery 1789 may supply power to at least one element of the electronic device 1701. According to an embodiment, the battery 1789 may include a primary cell that cannot be recharged, a rechargeable secondary cell or a fuel cell, for example.

The communication module 1790 may support the establishment of a direct (e.g., wired) communication channel or wireless communication channel between the electronic device 1701 and an external electronic device (e.g., the electronic device 1702, the electronic device 1704, or the server 1708), and may support the execution of communication through the established communication channel. The communication module 1790 may include one or more communication processors which are operated independently of the processor 1720 (e.g., an application processor) and support direct (e.g., wired) communication or wireless communication. According to an embodiment, the communication module 1790 may include a wireless communication module 1792 (e.g., a cellular communication module, a short-distance wireless communication module, or a global navigation satellite system (GNSS) communication module) or a wired communication module 1794 (e.g., a local area network (LAN) communication module or power line communication module). A corresponding communication module of these communication modules may communicate with an external electronic device over the first network 1798 (e.g., a short-distance communication network, such as Bluetooth, WiFi direct or infrared data association (IrDA)) or the second network 1799 (e.g., a long-distance communication network, such as a cellular network, the Internet, or a computer network (e.g., LAN or WAN)). Such types of communication modules may be integrated as one element (e.g., a single chip) or may be implemented as a plurality of different separate elements (e.g., a plurality of chips). The wireless communication module 1792 may confirm and authenticate the electronic device 1701 within a communication network, such as the first network 1798 or the second network 1799, using subscriber information (e.g., international mobile subscriber identifier (IMSI)) stored in the subscriber identity module 1796.

The antenna module 1797 may transmit or receive signals or power to or from the outside (e.g., an external electronic device). According to an embodiment, the antenna module 1797 may include one or more antennas. Among the one or more antennas, at least one antenna suitable for a communication method used for a communication network, such as the first network 1798 or the second network 1799, may be selected by the communication module 1790, for example. The signals or power may be transmitted and received between the communication module 1790 and the external electronic device through the selected at least one antenna.

At least some of the elements may be coupled through a communication method (e.g., a bus, a general purpose input and output (GPIO), a serial peripheral interface (SPI), or a mobile industry processor interface (MIPI)) between peripheral devices, and may exchange signals (e.g., instructions or data).

According to an embodiment, instructions or data may be transmitted and received between the electronic device 1701 and the external electronic device 1704 through the server 1708 coupled to the second network 1799. Each of the electronic devices 1702 and 1704 may be the same type or a different type of a device with respect to the electronic device 1701. According to an embodiment, some or all of operations executed in the electronic device 1701 may be executed in one or more of the external electronic devices 1702, 1704, or 1708. For example, if the electronic device 1701 has to perform functions or services automatically or in response to a request from a user or another device, the electronic device 1701 may request one or more external electronic devices to execute at least some of the functions or services instead of autonomously executing the functions or services or additionally. The one or more external electronic devices that have received the request may execute at least some of the requested functions or services or an additional function or service related to the request, and may transmit the results of the execution to the electronic device 1701. The electronic device 1701 may process the results without any change or additionally, and may provide the processed results as at least some of a response to the request. To this end, for example, a cloud computing, distributed computing, or client-server computing technology may be used.

The electronic device according to various embodiments disclosed in this document may be various types of devices. The electronic device may include a portable communication device (e.g., a smartphone), a computer device, a portable multimedia device, a portable medical device, a camera, a wearable device, or home appliances, for example. The electronic device according to an embodiment of this document is not limited to the aforementioned devices.

Various embodiments of this document and terms used in the embodiments are not intended to limit the technical characteristics, described in this document, to specific embodiments, and should be understood as including various changes, equivalents or alternatives of a corresponding embodiment. In relation to the description of the drawings, similar reference numerals may be used for similar or related elements. A singular form of a noun corresponding to an item may include one item or a plurality of items unless explicitly described otherwise in the context. In this document, each of phrases, such as "A or B", "at least one of A and B", "at least one of A or B", "A, B or C," "at least one of A, B and C", and "at least one of A, B, or C", may include all possible combinations of listed items along with a corresponding one of the phrases. Terms, such as a "first", a "second", or "the first" or "the second", may be used to merely distinguish between a corresponding element and another corresponding element, and do not limit corresponding elements in another aspect (e.g., importance or sequence). If any (e.g., first) element is described as being "coupled" or "connected" to another (e.g., second) element along with a term "functionally" or "communicatively" or without such a term, this means that the any element may be coupled to the another element directly (e.g., in a wired way), wirelessly, or through a third element.

The term "module" used in this document may include a unit implemented as hardware, software or firmware, and may be interchangeably used with a term, such as logic, a logical block, a part, or a circuit. The module may be an integrated part, or a minimum unit of the part or a part thereof, which performs one or more functions. For example, according to an embodiment, the module may be implemented in the form of an application-specific integrated circuit (ASIC).

Various embodiments of this document may be implemented as software (e.g., the program 1740) including one or more instructions stored in a storage medium (e.g., an embedded memory 1736 or an external memory 1738) readable by a machine (e.g., the electronic device 1701). For example, the processor (e.g., processor 1720) of the machine (e.g., the electronic device 1701) may invoke at least one of the one or more instructions stored in the storage medium, and may execute the instruction. This enables the machine to operate to perform at least one function based on the invoked at least one instruction. The one or more instructions may include a code generated by a complier or a code executable by an interpreter. The storage medium readable by the machine may be provided in the form of a non-transitory storage medium. In this case, the term "non-transitory" merely means that the storage medium is a tangible device and does not include a signal (e.g., electromagnetic wave). The term does not distinguish between a case where data is semi-permanently stored in the storage medium and a case where data is temporally stored in the storage medium.

According to an embodiment, the method according to various embodiments disclosed in this document may be included in a computer program product and provided. The computer program product may be traded as a product between a seller and a purchaser. The computer program product may be distributed in the form of a machine-readable storage medium (e.g., a compact disc read only memory (CD-ROM)) or may be distributed through an app store (e.g., PlayStore™) or directly between two user devices (e.g., smartphones) or online (e.g., download or upload). In the case of the online distribution, at least some of the computer program products may be at least temporarily stored or temporally generated in a machine-readable storage medium, such as the memory of the server of a manufacturer, the server of an app store or a relay server.

According to various embodiments, each (e.g., module or program) of the described elements may include a single entity or a plurality of entities. According to various embodiments, one or more of the aforementioned elements or operations may be omitted or one or more other elements or operations may be added. Alternatively or additionally, a plurality of elements (e.g., modules or programs) may be integrated into a single element. In such a case, the integrated elements may perform one or more functions of each of the plurality of elements in the same or similar manner that the functions are performed by a corresponding one of the plurality of elements prior to the integration. According to various embodiments, operations performed by a module, a program or other elements may be executed sequentially, in parallel, repeatedly or heuristically, or one or more of the operations may be executed in different order or may be omitted, or one or more other operations may be added.

Meanwhile, the preferred embodiments of the disclosure have been disclosed in this specification and drawings. Although specific terms have been used in this specification and drawings, they are merely used in common meanings in order to easily describe the technical contents of the disclosure and are not intended to limit the scope of the disclosure. It is evident to a person having ordinary skill in the art to which the disclosure pertains that in addition to the disclosed embodiments, other modified examples based on the technical spirit of the disclosure may be practiced.

The invention claimed is:

1. A method of operating a user equipment (UE) in a wireless communication system for monitoring one or more physical downlink control channel (PDCCH) candidates on a downlink bandwidth part (BWP) of a cell, the method comprising:

determining multiple control resource sets (CORESETs) configured for the downlink BWP, wherein the multiple CORESETs include a first CORESET having a first property related to a first beam on the downlink BWP of the cell, and a second CORESET having a second property related to a second beam on the downlink BWP of the cell different from the first beam;

identifying a first PDCCH candidate in the first CORESET and a second PDCCH candidate in the second CORESET to be monitored in overlapping PDCCH monitoring occasions, wherein the first PDCCH candidate is associated with the first beam and the second PDCCH candidate is associated with the second beam; and in response to the identifying of the first PDCCH candidate and the second PDCCH candidate, monitoring a PDCCH candidate selected from the first PDCCH candidate and the second PDCCH candidate corresponding to a common search space (CSS).

2. The method of claim 1, wherein the monitoring of the PDCCH candidate includes:

refraining from monitoring another PDCCH candidate not selected from the first PDCCH candidate and the second PDCCH candidate corresponding to a UE-specific search space (USS).

3. The method of claim 1, wherein the first property or the second property corresponding to the PDCCH is associated with a transmission configuration indicator (TCI).

4. The method of claim 1, wherein a time offset between the overlapping PDCCH monitoring occasions is smaller than a threshold value.

5. The method of claim 1, wherein a set of one or more PDCCH candidates, including the PDCCH candidate, for the UE to monitor is defined in terms of one or more PDCCH search space sets.

6. The method of claim 1, wherein the multiple CORESETs are configured by a radio resource control (RRC) signaling.

7. The method of claim 1, wherein the monitoring of the PDCCH candidate includes:

monitoring the PDCCH candidate based on a first antenna array to form the first beam included in the UE; and monitoring another PDCCH candidate not selected from the first PDCCH candidate and the second PDCCH candidate, based on a second antenna array to form the second beam included in the UE different from the first antenna array.

8. User equipment (UE) in a wireless communication system for monitoring one or more physical downlink control channel (PDCCH) candidates on a downlink bandwidth part (BWP) of a cell, the UE comprising:

a transceiver configured to transmit or receive a signal; and at least one processor coupled with the transceiver and configured to:

determine multiple control resource sets (CORESETs) configured for the downlink BWP, wherein the multiple CORESETs include a first CORESET having a first property related to a first beam on the downlink BWP of the cell, and a second CORESET having a second property related to a second beam on the downlink BWP of the cell different from the first beam, identify a first PDCCH candidate in the first CORESET and a second PDCCH candidate in the second CORESET to be monitored in overlapping PDCCH monitoring occasions, wherein the first PDCCH candidate is associated with the first beam and the second PDCCH candidate is associated with the second beam, and in response to the identifying of the first PDCCH candidate and the second PDCCH candidate, monitor a PDCCH candidate selected from the first PDCCH candidate and the second PDCCH candidate corresponding to a common search space (CSS).

9. The UE of claim 8, wherein the PDCCH candidate is monitored by:

refraining from monitoring another PDCCH candidate not selected from the first PDCCH candidate and the second PDCCH candidate corresponding to a UE-specific search space (USS).

10. The UE of claim 8, wherein the first property or the second property corresponding to the PDCCH is associated with a transmission configuration indicator (TCI).

11. The UE of claim 8, wherein a time offset between the overlapping PDCCH monitoring occasions is smaller than a threshold value.

12. The UE of claim 8, wherein a set of one or more PDCCH candidates, including the PDCCH candidate, for the UE to monitor is defined in terms of one or more PDCCH search space sets.

13. The UE of claim 8, wherein the multiple CORESETs are configured by a radio resource control (RRC) signaling.

14. The UE of claim 8, wherein the PDCCH candidate is monitored based on a first antenna array to form the first beam included in the UE, and wherein the at least one processor is further configured to monitor another PDCCH candidate not selected from the first PDCCH candidate and the second PDCCH candidate, based on a second antenna array to form the second beam included in the UE different from the first antenna array.

15. A computer-readable memory storing computer program instructions, which when executed by data processing equipment, cause a user equipment (UE) to monitor one or more physical downlink control channel (PDCCH) candidates on a downlink bandwidth part (BWP) of a cell by:

determining multiple control resource sets (CORESETs) configured for the downlink BWP, wherein the multiple CORESETs include a first CORESET having a first property related to a first beam on the downlink BWP of the cell, and a second CORESET having a second property related to a second beam on the downlink BWP of the cell different from the first beam;

identifying a first PDCCH candidate in the first CORESET and a second PDCCH candidate in the second CORESET to be monitored in overlapping PDCCH monitoring occasions, wherein the first PDCCH candidate is associated with the first beam and the second PDCCH candidate is associated with the second beam; and in response to the identifying of the first PDCCH candidate and the second PDCCH candidate, monitoring a PDCCH candidate selected from the first PDCCH candidate and the second PDCCH candidate corresponding to a common search space (CSS).

16. The computer-readable memory of claim 15, wherein the monitoring of the PDCCH candidate includes:

refraining from monitoring another PDCCH candidate not selected from the first PDCCH candidate and the second PDCCH candidate corresponding to a UE-specific search space (USS).

17. The computer-readable memory of claim 15, wherein the first property or the second property corresponding to the PDCCH is associated with a transmission configuration indicator (TCI).

18. The computer-readable memory of claim 15, wherein a time offset between the overlapping PDCCH monitoring occasions is smaller than a threshold value.

19. The computer-readable memory of claim 15, wherein a set of one or more PDCCH candidates, including the PDCCH candidate, for the UE to monitor is defined in terms of one or more PDCCH search space sets.

20. The computer-readable memory of claim 15, wherein the multiple CORESETs are configured by a radio resource control (RRC) signaling.

\* \* \* \* \*